United States Patent [19]

Ulman et al.

[11] Patent Number: 4,792,208

[45] Date of Patent: Dec. 20, 1988

[54] OPTICAL ARTICLE EXHIBITING A HIGH LEVEL OF SECOND ORDER POLARIZATION SUSCEPTIBILITY

[75] Inventors: Abraham Ulman, Rochester; David J. Williams; Thomas L. Penner, both of Fairport; Douglas R. Robello, Webster; Jay S. Schildkraut, Rochester; Michael Scozzafava, Rochester; Craig S. Willand, Rochester, all of N.Y.

[73] Assignee: Eastman Kodak Company, Rochester, N.Y.

[21] Appl. No.: 101,888

[22] Filed: Sep. 28, 1987

[51] Int. Cl.$^4$ .................. G02B 6/00; B29D 11/00; G03C 5/00

[52] U.S. Cl. ................. 350/96.34; 350/96.12; 350/96.14; 350/370; 350/374; 264/1.1; 264/1.3; 264/1.7; 430/321; 430/900; 430/921

[58] Field of Search ............ 350/96.10, 96.11, 96.12, 350/96.14, 96.30, 96.34, 96.15, 370, 374, 377; 428/411.1; 427/162, 164, 165; 430/159, 170, 270, 290, 321, 900, 922, 921; 264/1.1, 1.3, 1.7

[56] References Cited

U.S. PATENT DOCUMENTS

| | | | |
|---|---|---|---|
| 3,586,872 | 6/1971 | Tien | 350/96.12 X |
| 3,842,289 | 10/1974 | Yariv et al. | 350/96.12 X |
| 3,982,810 | 9/1976 | Tamir et al. | 350/96.12 X |
| 4,357,405 | 11/1982 | Leichter et al. | 430/900 X |
| 4,431,263 | 2/1984 | Garito | 350/96.34 |
| 4,515,429 | 5/1985 | Smith et al. | 350/96.13 |
| 4,536,450 | 8/1985 | Garito | 350/96.34 X |
| 4,605,869 | 8/1986 | Choe | 307/425 |
| 4,659,177 | 4/1987 | Choe et al. | 350/96.34 |
| 4,728,576 | 3/1988 | Gillberg-LaForce et al. | 428/411.1 |

OTHER PUBLICATIONS

Sandman, "A Generalized Approach to Organic Pi--Donor-Acceptor Systems" Molecular Electronic Devices (1982) Marcel-Decker Inc., N.Y., pp. 143-161.

Neal, Petty, Roberts, Ahmad, and Feast, "Second Harmonic Generation from LB Superlattices Containing Two Active Components," *Electronics Letters*, vol. 22, No. 9, 4/24/86.

Singer, Sohn and Lalama, "Second Harmonic Generation in Poled Polymer Films", *Appl. Phys. Lett.*, vol. 49, No. 5, 8/4/86, pp. 248-250.

D. J. Williams, "Organic Polymeric and Non-Polymeric Materials with Large Optical Nonlinearities", *Angew. Chem.* Int. Ed. Engl. 23 (1984) 690-703.

Zyss, "Nonlinear Organic Materials for Integrated Optics", *Journal of Molecular Electronics*, vol. 1, pp. 25-45, 1985.

Girling, Cade, Kolinsky, and Montgomery, "Observation of Second Harmonic Generation from a Langmuir-Bodgett Monolayer of a Merocyanine Dye," *Electronics Letters*, vol. 21, No. 5, 2/28/85.

D. S. Chemla and J. Zyss, *Nonlinear Optical Properties of Organic Molecules and Crystals*, vol. 1, pp. 280-282.

R. Rheinhardt, R. K. Tiwari, and T. P. Singh, "The Crystal Structure of Sulfisomidine", *Current Science*, vol. 49, p. 586, 1980.

*Primary Examiner*—William L. Sikes
*Assistant Examiner*—Brian M. Healy
*Attorney, Agent, or Firm*—Carl O. Thomas

[57] ABSTRACT

An optical article is disclosed containing, for the transmission of electromagnetic radiation, a medium exhibiting a second order polarization susceptibility greater than $10^{-9}$ electrostatic units comprised of polar aligned noncentrosymmetric molecular dipoles. The molecular dipoles have an electron donor moiety linked through a conjugated $\pi$ bonding system to an electron acceptor sulfonyl moiety.

31 Claims, 2 Drawing Sheets

OPTICAL ARTICLE EXHIBITING A HIGH LEVEL OF SECOND ORDER POLARIZATION SUSCEPTIBILITY

FIELD OF THE INVENTION

The invention relates to optical articles, particularly articles which exhibit effects attributable to the polarization of electromagnetic radiation. The invention relates specifically to optical articles which exhibit effects attributable to the nonlinear polarization of electromagnetic radiation.

BACKGROUND OF THE INVENTION

The significant polarization components of a medium produced by contact with an electric field are first order polarization (linear polarization), second order polarization (first nonlinear polarization), and third order polarization (second nonlinear polarization). On a molecular level this can be expressed in Equation 1:

$$P = \alpha E + \beta E^2 + \gamma E^3 \ldots \quad (1)$$

where
P is the total induced polarization,
E is the local electric field created by electromagnetic radiation, and
$\alpha$, $\beta$, and $\gamma$ are the first, second, and third order polarizabilities, each of which is a function of molecular properties.

$\beta$ and $\gamma$ are also referred to as first and second hyperpolarizabilities, respectively. The molecular level terms of Equation 1 are first order or linear polarization $\alpha E$, second order or first nonlinear polarization $\beta E^2$, and third order or second nonlinear polarization $\gamma E^3$.

On a macromolecular level corresponding relationships can be expressed by Equation 2:

$$P = \chi^{(1)} E + \chi^{(2)} E^2 + \chi^{(3)} E^3 \ldots \quad (2)$$

where
P is the total induced polarization,
E is the local electric field created by electromagnetic radiation, and
$\chi^{(1)}$, $\chi^{(2)}$, and $\chi^{(3)}$ are the first, second, and third order polarization susceptibilities of the electromagnetic wave transmission medium.

$\chi^{(2)}$ and $\chi^{(3)}$ are also referred to as the first and second nonlinear polarization susceptibilities, respectively, of the transmission medium. The macromolecular level terms of Equation 2 are first order or linear polarization $\chi^{(1)}E$, second order or first nonlinear polarization $\chi^{(2)}E^2$, and third order or second nonlinear polarization $\chi^3 E^3$.

To achieve on a macromolecular level second order polarization ($\chi^{(2)}E^2$) of any significant magnitude, it is essential that the transmission medium exhibit second order (first nonlinear) polarization susceptibilities, $\chi^{(2)}$, greater than $10^{-9}$ electrostatic units (esu). To realize such values of $\chi^{(2)}$ it is necessary that the first hyperpolarizability $\beta$ be greater than $10^{-30}$ esu.

A significant difficulty encountered in finding suitable molecular dipoles for second order polarization effects lies in the molecular requirements that must be satisfied to achieve usefully large values of $\beta$. For a molecule to exhibit values of $\beta$ greater than zero, it is necessary that the molecule be asymmetrical about its center—that is, noncentrosymmetric. Further, the molecule must be capable of oscillating (i.e., resonating) between an excited state and a ground state differing in polarity. It has been observed experimentally and explained by theory that large $\beta$ values are the result of large differences between ground and excited state dipole moments as well as large oscillator strengths (i.e., large charge transfer resonance efficiencies).

For $\chi^{(2)}$ to exhibit a usefully large value it is not only necessary that $\beta$ be large, but, in addition, the molecular dipoles must be aligned so as to lack inversion symmetry. The largest values of $\chi^{(2)}$ are realized when the molecular dipoles are arranged in polar alignment—e.g., the alignment obtained when molecular dipoles are placed in an electric field.

Second order polarization ($\chi^{(2)}E^2$) has been suggested to be useful for a variety of purposes, including optical rectification (converting electromagnetic radiation input into a DC output), generating an electro-optical (Pockels) effect (using combined electromagnetic radiation and DC inputs to alter during their application the refractive index of the medium), phase alteration of electromagnetic radiation, and parametric effects, most notably frequency doubling, also referred to as second harmonic generation (SHG).

For a number of years the materials employed for achieving second order polarization effects were noncentrosymmetric inorganic crystals, such as potassium dihydrogen phosphate and lithium niobate. Interest in nonlinear optical properties has increased in recent years, driven primarily by the emergence of optical telecommunication, but also stimulated by a broader need to raise optical manipulation capabilities closer to parity with those employed in electronics. This has resulted in an unsatisfied need for higher performance materials.

D. J. Williams, "Organic Polymeric and Non-Polymeric Materials with Large Optical Nonlinearities", *Angew. Chem. Int. Ed. Engl.* 23 (1984) 690–703, postulates mathematically and experimentally corroborates second order polarization susceptibilities in organic dipoles equalling and exceeding those of conventional inorganic dipoles.

Williams reports second order polarization susceptibilities, $\chi^{(2)}$, achieved with a variety of organic molecular dipoles. The molecular dipoles reported are comprised of an electron acceptor moiety bonded to an electron donor moiety by a linking moiety providing a conjugated $\pi$ bonding system for electron transfer. Specific electron donor moieties disclosed are dimethylamino, 2- or 4-pyridyl, 2-quinolinyl, and 2-benzothiazolyl. Specific conjugated $\pi$ bonding systems reported are phenylene and combinations of ethylene (vinylene) and phenylene moieties. Specific electron acceptor moieties disclosed are oxo, cyano, and nitro.

Zyss "Nonlinear Organic Materials for Integrated Optics", *Journal of Molecular Electronics*, Vol. 1, pp. 25–45, 1985, discloses in FIG. 1 a variety of molecular structures for nonlinear optics and in FIG. 2 varied nonlinear waveguide constructions.

Garito U.S. Pat. No. 4,431,263 discloses nonlinear optical, piezoelectric, pyroelectric, waveguide, and other articles containing a polymer of a diacetylene.

Choe U.S. Pat. No. 4,605,869 discloses a laser frequency converter containing a polymer of the structure:

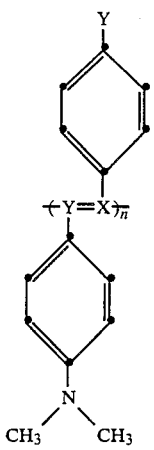

where n is an integer of at least 3 and Y is disclosed to be "nitro, cyano, trifluoromethyl, acyl, carboxy, alkanoyloxy, aroyloxy, carboxymido, alkoxysulfonyl, aryloxysulfonyl, and the like."

Girling, Cade, Kolinsky, and Montgomery, "Observation of Second Harmonic Generation from a Langmuir-Blodgett Monolayer of a Merocyanine Dye,"*Electonics Letters*, Vol. 21, No. 5, 2/28/85, disclose second harmonic generation with a merocyanine dye Langmuir-Blodgett (hereinafter also referred to as LB) monolayer. A Y-type LB layer assembly is also reported, but without second harmonic signal characteristics.

Neal, Petty, Roberts, Ahmad, and Feast, "Second Harmonic Generation from LB Superlattices Containing two Active Components," *Electronics Letters*, Vol. 22, No. 9, 4/24/86, disclose Y-type LB films formed of a hemicyanine dye and a nitrostilbene.

Singer, Sohn and Lalama, "Second Harmonic Generation in Poled Polymer Films", *Appl. Phys. Lett.*, Vol. 49, No. 5, 8/4/86, pp. 248–250, discloses placing the azo dye Disperse Red in poly(methyl methacrylate), spin coating on a transparent electrode of indium tin oxide, overcoating with a thin layer of gold, raising the film above its glass transition temperature, applying a poling electric field, and then the film well below its glass transition temperature with the field applied.

RELATED PATENT APPLICATIONS

Optical articles containing polar aligned organic molecular dipoles forming repeating units of a crosslinked polymeric matrix are the subject matter of Robello et al, "An Optical Article Containing a Polymeric Matrix Exhibiting a High Level of Second Order Polarization Susceptibility", Ser. No. 101,886, pending, concurrently filed and commonly assigned.

Optical articles containing polar aligned organic molecular dipoles as pendant groups of linear polymer repeating units are the subject of Robello et al, "An Optical Article Containing a Linear Polymer Exhibiting a High Level of Second Order Polarization Susceptibility", Ser. No. 101,884, pending, concurrently filed and commonly assigned.

Optical articles containing molecular dipoles held in polar alignment by a crosslinked polymeric binder are the subject matter of Scozzafava et al, "AN OPTICAL ARTICLE CONTAINING A TRANSMISSION MEDIUM EXHIBITING A HIGH LEVEL OF SECOND ORDER POLARIZATION SUSCEPTIBIL-ITY", Ser. No. 101,897, pending, concurrently filed and commonly assigned.

SUMMARY OF THE INVENTION

In one aspect this invention is directed to an optical article containing, for the transmission of electromagnetic radiation, a medium exhibiting a second order polarization susceptibility greater than $10^{-9}$ electrostatic units comprised of polar aligned noncentrosymmetric molecular dipoles having an electron donor moiety linked through a conjugated $\pi$ bonding system to an electron acceptor moiety to permit oscillation of the molecular dipole between a lower polarity ground state and a higher polarity excited state. The molecular dipoles are characterized in that the electron acceptor moiety is a sulfonyl moiety.

The substitution of sulfonyl as an electron acceptor moiety for the oxo, cyano, and nitro electron acceptor moieties previously known to the art offers a variety of advantages. None of the oxo, cyano, or nitro moieties can be chemically substituted without destroying their essential electronic properties. On the other hand, the sulfonyl moiety of the invention requires by definition a hydrocarbon substituent, which can be further substituted, if desired. Thus, the sulfonyl electron acceptor moiety offers much greater synthetic freedom for controlling the physical properties of the molecular dipole for optimum utilization. The substitution of sulfonyl dipoles for oxo, cyano, and nitro dipoles can extend optical utility to different wavelength regions of the spectrum by being more transparent to input electromagnetic radiation, output radiation—e.g., second harmonic radiation, or a combination of both. The sulfonyl dipoles offer a broader range of solvent and binder compatibilities for achieving the required polar alignments for useful effects produced by second order polarization in optical articles. Sulfonyl substitution to achieve optimized physical compatibility with other materials encountered in optical article fabrication is readily achieved. For the fabrication of Langmuir-Blodgett films the sulfonyl group can be chosen to exhibit either a hydrophilic or hydrophobic characteristic. Additionally, the sulfonyl group can be chosen to act as a linking group to a polymer backbone, if desired. By emplying a sulfonyl electron acceptor group in combination with a hydrocarbon substituted electron donor group it is apparent that both ends of the dipolar molecule can be optimized for the construction of polar aligned molecular dipoles.

Because of the myriad of different construction made possible by the invention, the foregoing amounts to only the barest mention of the advantages of the invention. A better appreciation can be obtained by considering in conjunction with the drawings the following detailed description of preferred embodiments.

DESCRIPTION OF PREFERRED EMBODIMENTS

Figure 1:
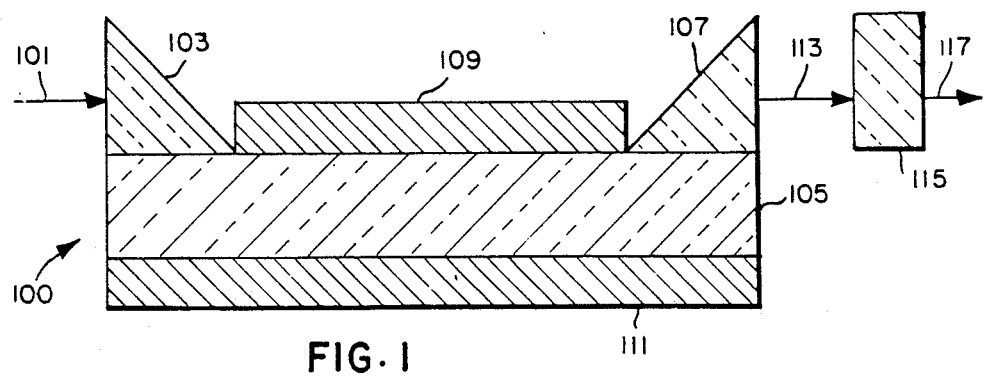
FIG. 1 is a second harmonic generating optical article.

The following are illustrative of optical articles satisfying the invention exhibiting effects attributable to second order polarization:

Referring to FIG. 1, the optical article 100 is capable of generating a second harmonic of electromagnetic radiation 101 supplied to it. Incoming electromagnetic radiation is introduced through input means 103, shown as a first prism, into an optically active transmission medium 105 which exhibits a high level ($>10^{-9}$ esu) second order or first nonlinear polarization susceptibility, hereinafter referred to simply as the optically active transmission medium according to the invention or, more succinctly, as the optically active transmission medium. Electromagnetic radiation is transmitted through the medium 105 to output means 107, shown as a second prism. In the simplest form of the optical article neither the input nor output prisms are required. Escape of electromagnetic radiation from the transmission medium can be minimized by locating optional guiding elements 109 and 111 above and below the transmission medium. The guiding elements can minimize radiation loss by being chosen to exhibit a lower refractive index than the transmission medium. Additionally or alternatively, the guiding elements can be chosen to be reflective to the electromagnetic radiation.

When the transmission medium is constructed according to the requirements of the invention, specifically described below, at least a portion of the electromagnetic radiation entering the transmission medium will be alterred in frequency during its travel through the medium. More specifically, a second harmonic of the frequency will be generated. The electromagnetic radiation leaving the output means, indicated by arrow 113, exhibits both the original frequency of the input radiation and a second harmonic of this frequency. The electromagnetic radiation retaining the original frequency can, if desired, be removed by passing the electromagnetic radiation leaving the article through a filter 115 capable of absorbing radiation of the original frequency while transmitting higher frequency (shorter wavelength) portions of the electromagnetic radiation. By employing one or a combination of filters any broad or narrow frequency band of electromagnetic radiation can be retained in the transmitted output electromagnetic radiation 117.

Figure 2:
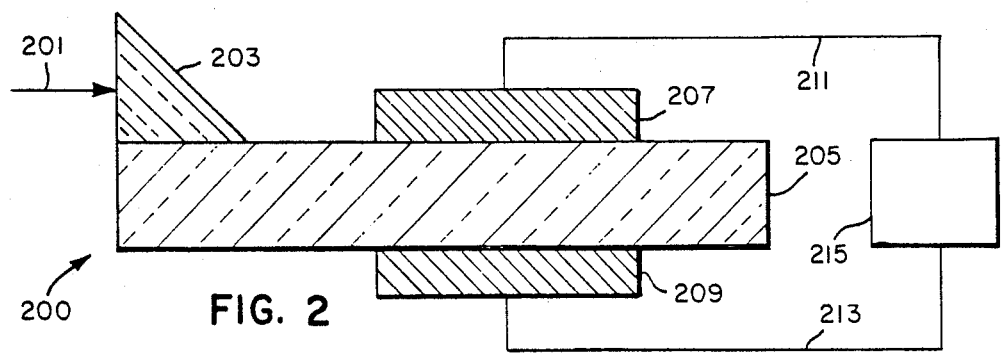
FIG. 2 is a DC signal providing optical article.

Referring to FIG. 2, an optical article 200 is shown capable of producing a DC potential when electromagnetic radiation 201 is supplied through input means 203, shown as a prism, to optically active transmission medium 205, which can be identical to medium 105, described above. When electromagnetic radiation is being transmitted through the medium a potential difference is produced between upper electrode 207 and lower electrode 209 in electrical contact with the upper and lower surfaces of the transmission medium. Electrical conductors 211 and 213 can be used to relay the potential of the upper and lower electrodes to an electronic response unit 215. The electronic response unit can in its simplest form be a unit that provides a digital response indicative of the the presence or absence of electromagnetic radiation in the transmission medium. Alternatively, the electronic response unit can provide an analog response indicative not only of the presence, but also the intensity or wavelength of electromagnetic radiation in the transmission medium.

Figure 3:
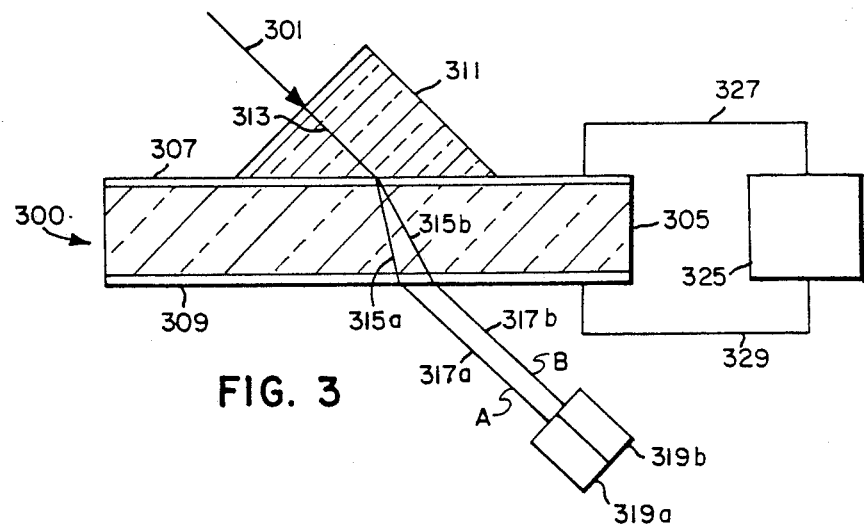
FIG. 3 is an electromagnetic beam displacement optical article.

Referring to FIG. 3, the optical article 300 is capable of physically displacing a beam 301 of electromagnetic radiation being transmitted through it as a function of the concurrent receipt of a DC bias. Optically active transmission medium 305, which can be identical to optically active medium 105 or 205, is provided with transparent upper and lower electrodes 307 and 309. The electrodes can, for example, be thin layers of a vacuum vapor deposited metal or metal oxide—e.g., indium tin oxide. An electromagnetic radiation input means, shown as prism 311, is located on the upper transparent electrode. The electromagnetic radiation passes through the prism as indicated by arrow 313. When the electromagnetic radiation enters the transmission medium, it follows either path 315a or path 315b. Depending upon which of the two alternative paths are followed, the first electromagnetic radiation either travels along path 317a or 317b upon emerging from the lower transparent electrode. The paths 315a and 317a together constitute an A path through the optical article while the paths 315b and 317b together constitute a B path through the optical article. Sensing units 319a and 319b are located to receive electromagnetic radiation traveling along the A and B paths, respectively. It is apparent that only one of the two sensing units is essential, since failure to sense electromagnetic radiation can be employed to indicate that the electromagnetic radiation has shifted to the alternate path.

Shifting of electromagnetic radiation between the A and B paths is achieved by supplying a DC bias to the upper and lower electrodes while transmission of the electromagnetic radiation through the optically active transmission medium is occurring. To accomplish the required DC bias a DC potential source is shown connected to the upper and lower electrodes by electrical conductors 327 and 329.

Application of the DC bias alters the refractive index of the transmission medium when it is formed of a material exhibiting a significant second order susceptibility. This causes the first electromagnetic radiation beam to be refracted at a different angle when the transmission medium is electrically biased, and this changes the first electromagnetic radiation path through the transmission medium. In some instances the refractive index of the transmission medium is increased by the electrical bias and in other instances lowered by the electrical bias, depending upon whether the molecular dipole contained within the transmission medium exhibits a positive or negative first hyperpolarizability $\beta$.

Figure 4:
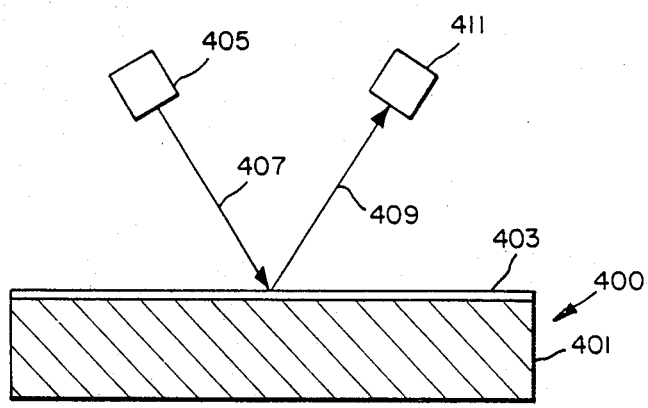
FIG. 4 is an alternative form of a second harmonic generating optical artical.

In FIG. 4 an optical article 400 is shown comprised of a reflective substrate 401 and an optically active transmission medium 403 according to the invention shown in the form of a layer. Electromagnetic radiation is supplied from a source 405 as indicated by arrow 407. The electromagnetic radiation traverses the optically active transmission medium, is reflected by the substrate, and traverses the optically active transmission medium a second time. Electromagnetic radiation leaving the optically active transmission medium is indicated by arrow 409. A sensor 411 which is responsive to the second harmonic of the input electromagnetic radiation, but not radiation at the wavelength of the input radiation, is shown provided to receive electromagnetic radiation from the layer 403. Instead of employing a sensor that is selectively responsive to the second harmonic wavelength, a sensor with a broader frequency band of response can be employed in combination with one or more filter elements, as described above in connection with FIG. 1. The thinner the layer of the optically active transmission medium, the higher the intensity of the input electromagnetic radiation must be in order to achieve a given output of second harmonic radiation. In the limiting case the optically active transmission medium can be a monomolecular oriented molecular dipole layer.

Figure 6:
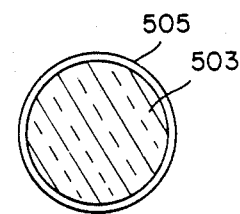
FIG. 6 is a section taken along section line 6—6 in FIG. 5.
Figure 5:
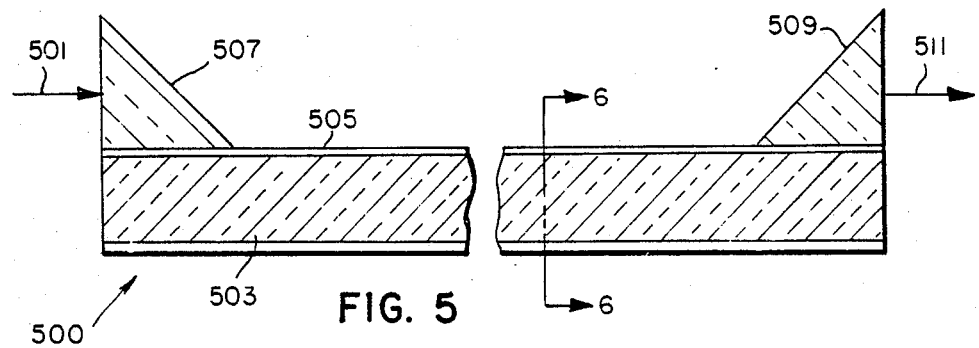
FIG. 5 is an optical article for achieving parametric effects.

In FIGS. 5 and 6 an optical article 500 according to the invention is shown capable of inducing parametric effects, such as second harmonic generation, by acting on input electromagnetic radiation, indicated by arrow 501. To achieve alteration of the input radiation a transparent optical waveguide 503 of any conventional type is provided having on its external surface a layer of an optically active transmission medium 505 according to the invention, which can have the same properties as the medium 105, described above. The optical waveguide 503 is normally optically passive—that is, exhibits no significant levels of nonlinear (second or third order) polarization.

Means 507, shown as a prism, is provided to introduce the input electromagnetic radiation into the waveguide. Means 509, shown as a prism, is provided to retrieve electromagnetic radiation from the waveguide. Although the optically active transmission medium is shown interposed between the input and output prisms, it is appreciated that an interposed layer is not required in these locations.

As the input electromagnetic radiation traverses the waveguide, a portion of the radiation will impinge on the surrounding layer of the optically active transmission medium and be refracted back into the waveguide. To avoid escape of electromagnetic radiation a reflective layer, not shown, can be coated over the optically active transmission medium. Successive impingements of transmitted radiation on the optically active medium result in measureable parametric effects, such as second harmonic generation.

Figure 7:
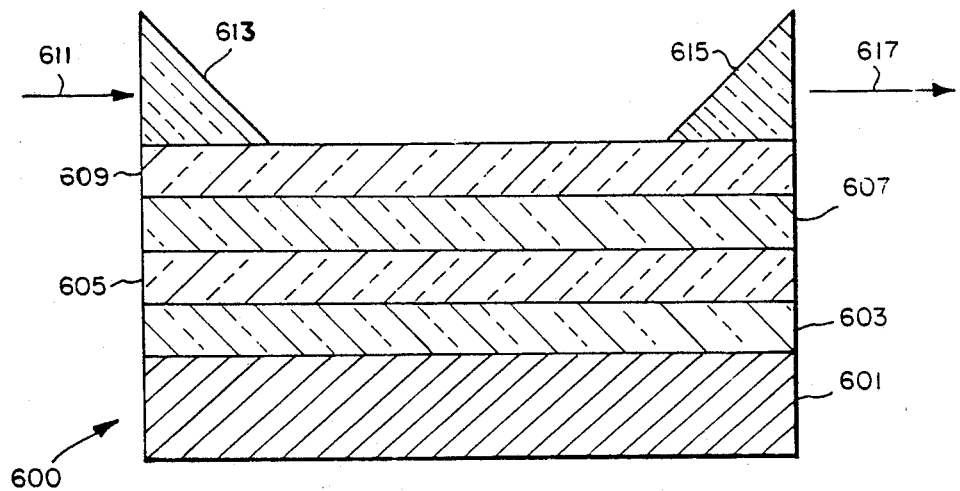
FIG. 7 is an optical article for achieving parametric effects and phase shifting.

In FIG. 7 an optical article 600 is shown capable of producing useful parametric effects similarly as optical article 500, but exhibiting a greater capability for better phase matching, such as that desired for improved efficiency second harmonic generation. A substrate 601 is shown supporting superimposed waveguide layers 603, 605, 607, and 609. While four superimposed layers are shown, in practice any odd or even number of superimposed layers can be provided. The odd layers (603 and 607) in the sequence can be formed of an optically active transmission medium according to the invention (similarly as medium 105) while the even layers (605 and 609) can be formed of a passive or linear optical medium, as described above. Alternatively, the optically active and passive transmission media layers can be reversed in order.

To achieve useful parametric effects, electromagnetic radiation, indicated by arrow 611 is supplied to the waveguiding layers through input means 613, shown as a prism. In passing through the waveguiding layers to output means 615, shown as a prism, the optically active and passive media layers together alter the form of the electromagnetic radiation, indicated by output arrow 617, so that parametric (e.g., second harmonic) effects are more efficiently generated.

The optical article constructions described above are exemplary of a large variety of possible differing optical article constructions. The present invention is compatible with any conventional construction of an optical article relying on a significant second order polarization susceptibility to produce a useful effect. For example, whereas in connection with FIG. 5 an optical article is disclosed in which the optically active transmission medium surrounds a substrate, which can have linear optical properties, Zyss, cited above, in FIG. 2(d) discloses just the converse arrangement, in which the optically active transmission medium forms a core clad with a shell of a linear optical transmission medium. Zyss also discloses an arrangement in which the optically active transmission medium is located in a groove on the surface of a linear optical transmission substrate. All of the optical article constructions of Zyss exhibiting second order nonpolarization effects can be applied to the practice of this invention and are here incorporated by reference.

An essential component of each of the optical articles of this invention is an optically active transmission medium exhibiting a second order polarization susceptibility greater than $10^{-9}$ (preferably greater than $10^{-8}$) electrostatic units containing polar aligned molecular dipoles. The molecular dipoles are comprised of an electron acceptor sulfonyl moiety bonded to an electron donor moiety by a linking moiety providing a conjugated $\pi$ bonding system to permit oscillation of the molecular dipole between a lower polarity ground state and a higher polarity excited state. The molecular dipoles are represented by the oscillation (resonance) ground state and excited state extremes, since these lend themselves to representation by chemical formulae. Formula pairs are useful in bracketing the range of structural variance, even though it is recognized that in practice neither of the oscillation extremes may be actually fully realized. The molecular dipoles of this invention are generally represented by Formula Pair 3.

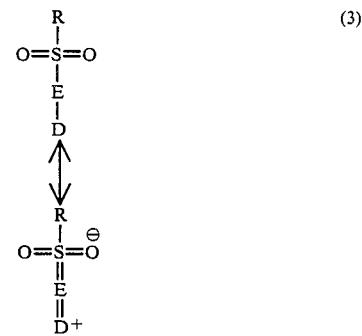

where

D is an electron donor moiety,

E is a linking moiety, specifically a conjugated $\pi$ bonding system, which provides a pathway for charge transfer resonance, and R is an optionally substituted hydrocarbon moeity.

For convenience the molecular dipoles are named using their ground state structures, unless otherwise noted.

The electron donor moieties can take any convenient conventional form. The electron donor moiety can be an amino moiety. Primary, secondary, and tertiary amino moieties are contemplated for use, with the latter being most preferred and the former being least preferred. Only the secondary and tertiary amino moieties allow for substituent modification of properties similarly as the sulfonyl moiety, and only the tertiary amino moiety produces the most highly polar excited state. When the electron donor moiety is an amino moiety, the molecular dipoles of the invention satisfy Formula Pair 4.

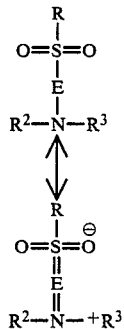

(4)

where
E is a linking moiety, specifically a conjugated π bonding system, which provides a pathway for charge transfer resonance,
R is an optionally substituted hydrocarbon moiety, and
$R^2$ and $R^3$ are hydrogen or, preferably, optionally substituted hydrocarbon moieties.

Instead of employing an amino group as an electron donor moiety, it is specifically contemplated to employ an oxy or thio electron donor moiety. When such oxy and thio electron donor moieties are employed, the molecular dipoles of the invention satisfying Formula Pair 5.

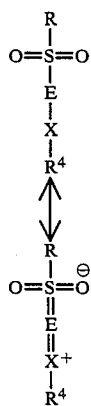

(5)

where
E is a linking moiety, specifically a conjugated π bonding system, which provides a pathway for charge transfer resonance,
R and $R^4$ are optionally substituted hydrocarbon moieties, and
X is oxygen or sulfur.

The moiety E linking the electron donor and sulfonyl electron acceptor moietes is selected to satisfy three fundamental characteristics. First, it is chosen so that the molecule will be noncentrosymmetric, thereby exhibiting a dipole moment even in its ground state. Second, it is chosen to provide sufficient spatial separation of the electron donor and acceptor moieties to provide a large dipole moment in the polar excited state of the electron donor and acceptor moieties. Third, the linking moiety is chosen to permit efficient oscillation or charge transfer resonance between the ground and excited states. This results in large differences between the excited state and ground state dipole moments.

A conjugated π bonding system can satisfy all three requirements. On its most elemental level such a bonding system can be provided by chains of methine (a.k.a., methenyl and methylidyne) groups, which are (except as specifically noted) to be understood as including substituted forms. Such chains can optionally include one or more aza (—N=) moieties.

To satisfy the requirement for oscillation or charge transfer resonance, it is essential that the resonance path be defined by an even number of atoms. The number of atoms in the resonance path between the electron donor and acceptor is preferably at least 4 and optimally at least 8.

While increasing the number of atoms in the resonance path should increase the excited state dipole moment, it also tends toward nonplanar molecular conformations which lead to losses in hyperpolarizability density ($\beta/V$, where V is the transmission medium volume) as well as thermal and other energy losses (e.g., losses in transparency), so that at first diminishing gains and then overall losses result from increasing the number of atoms in the resonance path. It is generally preferred that the number of atoms in the resonance path between the electron donor and acceptor be 20 or less and optimally 14 or less.

Thus, in a more specific form, the molecular-dipoles of this invention can be represented by Formula Pair 6

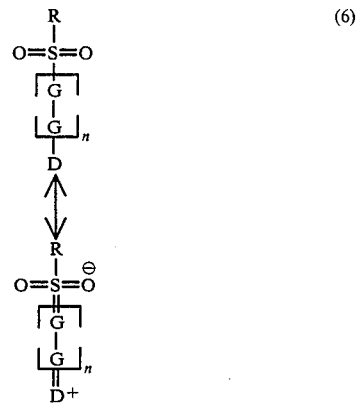

(6)

where
D is an electron donor moiety;
G is independently in each occurrence methine or aza;
n is 4 to 20, preferably 8 to 14; and
R is an optionally substituted hydrocarbon.

For synthesis convenience it is generally preferred that no more than two adjacent G groups be aza groups. Thus, both individual aza (—N=) and diazo (—N=N—) groups are contemplated to be present in the linking moiety.

While the aza groups permit no substitution, the methine groups can be substituted, if desired. Preferred linking moieties are those which have been at least partially rigidized by substituents bridging methine groups in the resonance path. Rigidization of the linking moiety reduces energy dissipation. In a specifically preferred form of bridging substitution of the methine groups in the resonance path, the linking moiety is wholly or, preferably, partially aromatized. Both carbocyclic and heterocyclic aromatization is specifically contemplated.

A specifically preferred class of molecular dipoles satisfying the requirements of the invention are 4-sulfonyl-4'-D-stilbenes, where D is an electron donor moiety, such as an amino, oxy, or thio substituent, as previously defined. In these stilbenes, the electron acceptor sulfonyl and electron donor moieties are each bonded to one terminal aromatized portion of the conjugated $\pi$ bonding linking moiety, with the aromatized portions of the linking moiety being joined by an ethylene (vinylene) group. When the single ethylene linking group of the stilbene is replaced by two or more ethylene groups, within the resonance path chain length limits noted above, highly advantageous analogues are realized. Substitution of individual methine groups with aza groups, particularly in the ethylenic portion of the linkage, are compatible with achieving high $\beta$ values. The ethylenically expanded and aza substituted stilbene variants are hereinafter referred to as stilbenoid compounds, since they are compounds which share significant property similarities with stilbenes.

In a preferred form of the invention, the stilbenes and stilbenoid compounds can be presented by Formula Pair 7:

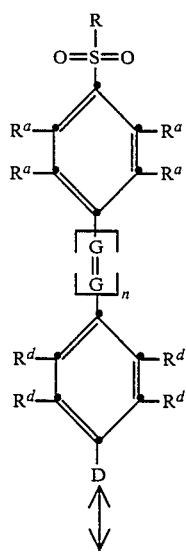

(7)

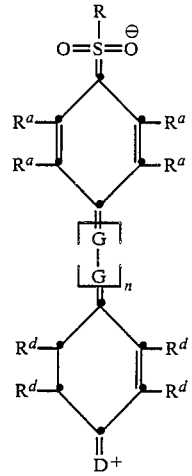

-continued where

D is an electron donor moiety;

G is independently in each occurrence a methine or aza moiety, with the proviso that no more than two aza moieties are next adjacent;

n is an integer of from 1 to 3;

R is an optionally substituted hydrocarbon substituent;

$R^a$ represents hydrogen, substituents which together with the sulfonyl group $SO_2R$ collectively enhance the electron acceptance of the phenyl ring to which they are attached, or a combination of both; and $R^d$ represent hydrogen, substituents which together with the electron donor D collectively enhance the electron donation of the phenyl ring to which they are attached, or a combination of both.

In another preferred form of the invention the terminal methine group attached to the electron acceptor sulfonyl, $SO_2R$, moiety is replaced by an aza (—N=) group. The sulfonyl and aza groups in combination form a sulfonimino, =N—$SO_2R$, group. By including the aza portion of the sulfonimino group as part of the linking moiety E all the relationships previously discussed are applicable; however the sulfonimino group is incompatible with the stilbenoid structures of Formula Pair 7. One preferred class of dipolar compounds exhibiting high levels of hyperpolarizability incorporating a terminal sulfonimino group are represented by Formula Pair 8.

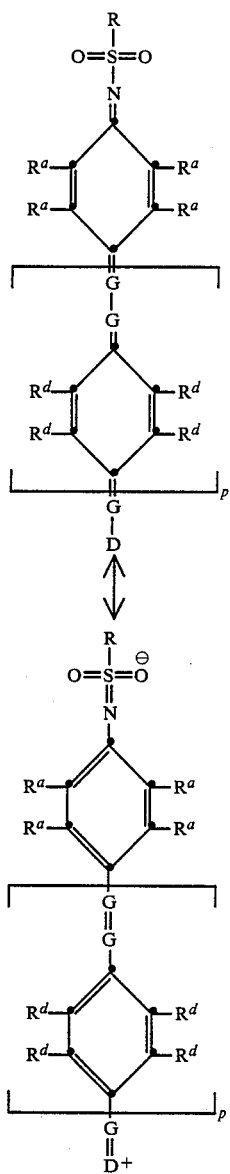 (8)

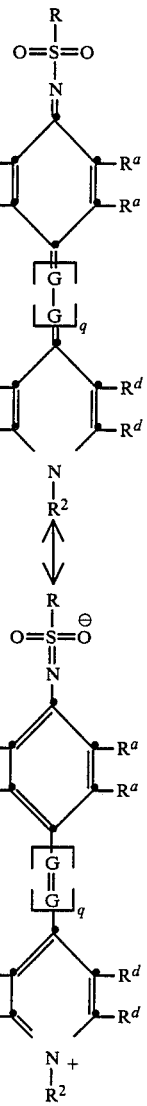 (9)

where
- D, R, $R^a$, and $R^d$ are as previously defined;
- G is independently in each occurrence a methine or aza moiety, with the proviso that no more than two aza moieties are next adjacent; and
- ps is 0 or 1, In Formula Pair 8 neither of the two terminal resonance path atoms of the linking moiety are included in a rigidizing aromatic ring, but the rigidizing aromatic ring or rings are located next adjacent to each resonance path terminal atom of the linking moiety. Note that either 6 or 12 atoms are present in the resonance path provided by the linking moiety.

When electron donation is from a nitrogen atom, a terminal aromatic rigidizing ring system formed by a 4-pyridinium and 4-pyrido tautomer is possible, as illustrated by the preferred dipolar compounds of Formula Pair 9.

where
- R, $R^2$, $R^a$, and $R^d$ are as previously defined;
- G is independently in each occurrence a methine or aza moiety, with the proviso that no more than two aza moieties are next adjacent; and
- q is an integer of from 0 to 3.

In specifically preferred forms of the compounds of Formulae 7 through 9 the two aromatic rings are coplanar. To preserve the coplanarity of the rings it is preferred that, when the G groups of the formulae are methine groups, they remain unsubstituted. However, sterically compact methine substituents compatible with coplanarity, such as fluorine and lower alkyl groups of from about 1 to 3 carbon atoms, are contemplated.

For synthetic simplicity the aromatic rings can be left unsubstituted while achieving high levels of performance. It is appreciated, however, that the dipole moment can be increased by employing in available phenylene ring positions substituents which supplement the electronic asymmetry induced by the electron acceptor sulfonyl moiety and the electron donor moiety D. Electron donating and accepting properties of phenyl rings imparted by substitution have been extensively studied and quantified by the assignment of Hammett sigma values. Substituents which render phenyl rings electron accepting are assigned positive Hammett sigma values while negative Hammett sigma values are assigned to substituents which render phenyl rings electron donating. Hydrogen atoms attached to phenyl rings are assigned a Hammett signal value of zero. By algebraically summing the Hammett sigma values of substituents to a phenyl ring it is possible to arrive at a net Hammett sigma value for the phenyl ring that is indicative of whether the substituted phenyl ring is electron accepting (indicated by a positive net Hammett sigma value) or electron donating (indicated by a negative net Hammett sigma value). Further, the algebraic sum of the substituent Hammett sigma values quantifies the degree to which the substituted phenyl ring is electron accepting or donating.

Lange's Handbook of Chemistry, 12 Ed., McGraw-Hill, 1979, Table 3-12, pp. 3-135 to 3-138, here incorporated by reference, lists Hammett sigma values for a large number of commonly encountered substituents. Ortho and para position substituents usually exhibit identical Hammett sigma values, which differ to only a limited degree from meta sigma values and can, in any event, be determined from published lists. Exemplary simple substituents and their published meta Hammett sigma values are primary and second alkyl substituents, such as methyl $\alpha = -0.07$, ethyl $\rho = -0.07$, n-propyl $\rho = -0.05$, i-propyl $\rho = -0.07$, n-butyl $\rho = -0.07$, and sec-butyl $\rho = -0.07$. These alkyl substituents are synthetically convenient and therefore contemplated. Alkyl substituents containing tertiary carbon atoms and particularly tertiary alkyl groups tend to be even more highly electron donating. Aryl groups such as phenyl, $\alpha$-naphthyl, and $\beta$-naphthyl groups are contemplated (e.g., phenyl $\rho = +0.06$). Other useful and specifically contemplated hydrocarbon substituents include alkyaryl substituents (e.g., p-methylphenyl), aralkyl substituents (e.g., benzyl $\rho = -0.05$ and phenethyl), alkenyl substituents (e.g. vinyl $\rho = +0.02$), aralkenyl substituents (e.g., 2-phenylvinyl $\rho = +0.14$), alkynyl substituents (e.g., ethynyl $\rho = +0.21$, propargyl, and 2-butynyl), and aralkynyl substituents (e.g., phenethynyl $\rho = +0.14$). Substituted hydrocarbon substituents are also contemplated, such as haloalkyl substituents (e.g., bromomethyl, chloromethyl $\rho = -0.12$, fluoromethyl and iodomethyl), haloaryl substituents (e.g., p-bromophenyl, m-bromophenyl, and p-chlorophenyl, and hydroxyalkyl substituents (e.g., hydroxymethyl $\rho = +0.08$).

It is specifically preferred to select $R^a$ substituents independently from among known phenyl ring substituents having a positive Hammett sigma value and to select $R^d$ substituents independently from among known phenyl ring substituents having a negative Hammett sigma value. However, it is recognized that combinations of $R^a$ substituents are possible, some of which are electron donating, some of which are essentially neutral, and some of which are electron accepting. Combinations of $R^a$ substituents are possible which, together with the sulfonyl, $SO_2R$, algebraically sum to a positive net Hammett sigma value. Preferably the combination of $R^a$ substituents, without inclusion of the sulfonyl group, provide a positive net Hammett sigma value. Similarly, any combination of $R^d$ substituents is possible which, together with the electron donor, D, algebraically sum to a negative net Hammett sigma value. Preferably the combination of $R^d$ substituents, without inclusion of the substituent D, provide a negative net Hammett sigma value.

To avoid perturbation of the desired resonance pattern no one $R^a$ substituent should have a Hammett sigma value more positive than that of the sulfonyl electron acceptor moiety, and no one $R^d$ substituent should have a Hammett sigma value more negative than that of the electron donor moiety D. It is also important to bear in mind that large $\beta$ values depend not only on achieving a large dipole moment, but also on achieving a large difference between the excited state and ground state dipole moments. Thus substituents must be chosen from among those which are compatible with reversible charge transfer—i.e., charge transfer resonance. Thus substituents of the very highest and lowest Hammett sigma values are preferably avoided.

It is recognized that two adjacent $R^a$ or $R^d$ substituents can, if desired, together form a ring fused with the phenyl ring to which they are attached. Fused benzo rings are specifically contemplated. Polycyclic aromatic rings, such as naphthyl and anthracyl aromatic rings, in the linking moieties are therefore possible. Fused benzo rings are compatible with the coplanarity of the aromatic nuclei and, unless they are themselves substituted, have little effect on the electronic asymmetry. It is further recognized that $R^2$, $R^3$, and $R^4$ can, if desired, form with an $R^d$ substituent ortho to D a fused ring, preferably of 5 or 6 member ring. For example, the amino electron donor moiety in Formula Pair 7 can form with the linking moiety a julolidene ring. Numerous other fused rings containing the heteroatom of the electron donor moiety are possible. However, while within the contemplation of useful dipole molecular structure, fused ring substituent patterns are not generally preferred, since they increase molecular bulk, thereby reducing the hyperpolarizability density $\beta/V$ (defined above), while lacking in many instances the synthetic convenience of monovalent substituents.

In their preferred forms R, $R^2$, $R^3$, and $R^4$ are monovalent hydrocarbon substituents. Specifically contemplated are all aliphatic hydrocarbon substituents containing from 1 to about 40 carbon atoms—e.g., alkyl, alkenyl, and alkynyl, including all cyclic forms thereof; all aromatic hydrocarbon substituents containing from 6 to 20 carbon atoms (preferably 6 to 10 carbon atoms—i.e., phenyl and naphthyl); and hydrocarbon substituents which are composites of these aliphatic and aromatic substituents—e.g., alkaryl, aralkyl, alkaralkyl, aralkaryl, etc. The aliphatic substituents and substituent moieties can contain unsaturation for steric or synthetic convenience. All of the hydrocarbon substituents can, optionally, themselves be substituted to facilitate polar alignment in the transmission medium.

The hydrocarbon and substituted hydrocarbon substituents of the electron acceptor and donor moieties can be chosen, if desired, to enhance the electron accepting or donating functions of the electron acceptor and donor moieties, respectively. Hammett sigma values of the electron donor and electron acceptor moieties are useful for this purpose, as explained above in connection with the selection of $R^a$ and $R^d$ substituents. For example, the Hammett sigma values of a primary amino group ($-NH_2$); secondary amino groups, such as alkylamino (e.g., $-NHCH_3$, $-NHCH_2CH_3$, and $-NH-n-C_4H_9$); and tertiary amino groups, such as dialkylamino (e.g., dimethylamino) range from $-0.04$ for the primary amino group to $-0.83$, with the secondary and tertiary amino groups generally having Hammett sigma values more negative than −0.20.

Since a large variety of substituents are compatible with producing a molecular dipole, the determining factor in selecting hydrocarbon and substituted hydrocarbon substituents of the electron acceptor and donor moieties is in most instances related to the approach chosen for achieving polar alignment of the molecular dipoles in forming a transmission medium. The approaches to molecular dipole alignment discussed below place varying requirements on the molecular characteristics of the dipole and its substituents, but, because of their diversity, the various alignment techniques in aggregate allow a very wide latitude of choice in selecting molecular dipole molecules for incorporation in the transmission bodies of the optical articles of this invention.

In some instances dipoles satisfying the requirements of this invention can be synthesized which, by reason of their molecular configuration, form crystals in which the dipole molecules are in polar alignment. By growing such crystals at a slow rate under conditions of near equilibrium with their mother liquor macroscopic crystals suitable for use as transmission bodies in the optical devices of this invention can be formed. Unfortunately, the requirement of spontaneous crystallization of the molecular dipoles in a polar aligned geometric arrangement is too sterically limiting to be applicable to a large variety of molecular dipoles.

An approach to alignment of molecular dipoles that can be practiced with any soluble molecular dipole is to form the transmission medium of a solution containing the molecular dipole as a solute at any concentration of from about 1 percent by weight up to saturation. By placing the solution in a sealed container, such as a glass receptacle, the transmission medium can be given its desired geometrical shape. When it is desired to create an optical effect requiring a high level of second order polarization susceptibility in the transmission medium, such as second harmonic generation, the transmission medium is placed in an electrical field, which causes the dissolved dipoles to align themselves in the field. By passing electromagnetic radiation through the transmission medium a second harmonic frequency can be generated. Although this arrangement allows a broad choice of molecular dipoles, the liquid state of the transmission medium can be inconvenient. Further, the application of an electric field during electromagnetic radiation transmission is incompatible with some of the optical articles uses described above and, where practicable, may nevertheless be inconvenient.

Preferred optically active transmission bodies are those which are formed of molecular dipoles which retain a fixed alignment in the completed transmission medium. One approach for achieving such optically active transmission bodies, particularly thin film (about 2000 Å) transmission bodies, is to form Langmuir-Blodgett (LB) films of the molecular dipoles. for the fabrication of LB films one of the electron acceptor and electron donor moieties of the molecular dipole is chosen to be hydrophilic while the remaining of these moieties is chosen to be hydrophobic. A small amount of the molecular dipole spread on the surface of a liquid forms a surface film of monomolecular thickness at the air-liquid interface. If the supporting liquid is a polar liquid, such as water, the hydrophilic moieties of the molecular dipoles are drawn into the liquid, while the hydrophobic moieties are attracted to the non-polar, air side of the interface to hold the molecular dipole molecules at the surface of the supporting liquid body. When the surface of the supporting liquid is fully covered by the mono- molecular layer, the result is polar alignment of the molecular dipole molecules on the surface of the supporting liquid. If a support is slowly immersed in the film bearing liquid body or slowly withdrawn from it, an oriented monomolecular film is formed on the substrate. If, instead of air a non-miscible, nonpolar liquid is substituted for air, the same result is achieved, except that the molecular dipole is reversed in its orientation.

While the optical articles 400 and 500 described above each can be constructed with a monomolecular molecular dipole film, to improve the efficiency of these articles and to permit the construction of other articles it is preferred that a plurality of superimposed LB films be deposited on a substrate. In constructing superimposed LB films there are three possibilities: X-type LB deposition, Z-type LB deposition, and Y-type LB deposition.

In Z-type LB deposition the second and successive LB layers have the same terminal hydrophobe and hydrophile orientation as the first LB layer. If, for example, it is assumed that the electron donor moiety of the molecular dipole contains a hydrophobic substituent and the electron acceptor moiety a hydrophobic substituent and that an LB film is formed on water, the following three layer Z-type LB deposition results:

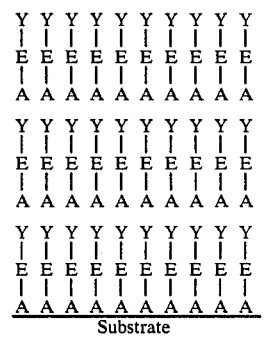

where
YEA represents a single molecular dipole molecule;
A is a hydrophilic sulfonyl moiety;
E is a linking moiety, as previously defined; and
Y is a hydrophobic electron donor moiety.

Depending upon whether the support and the electron donor and electron acceptor moieties contain hydrophilic or hydrophobic substituents, four combinations are possible:

where
A is a hydrophilic sulfonyl moiety;
Y is a hydrophobic electron donor moiety;
E is a linking moiety, as previously defined;
K is a hydrophobic sulfonyl moiety;
M is a hydrophilic electron donor moiety; and
S represents the substrate.

The first two combinations can be used to produce Z-type LB film assemblies, while the second two combinations can be used to produce X-type LB film assemblies. All of these combinations are within the contemplation of the invention.

While X-type or Z-type LB deposition to form multiple polar aligned molecular dipole layers are contemplated, it is recognized that in Z-type LB deposition the molecular dipoles of successive layers are positioned with hydrophilic or hydrophobic moieties of an overlying LB layer resting on hydrophobic or hydrophilic moieties, respectively, of an underlying LB layer. This results in these LB layer assemblies exhibiting metastable properties. In other words, while X-type and Z-type LB layer assemblies can be formed, they are susceptible to collapse into a disordered state.

The present invention makes possible Y-type LB deposition, resulting in layer assemblies of much higher relative stability. Whereas in Z-type LB deposition hydrophilic and hydrophobic molecular moieties of successive layers are placed in adjacency, in Y-type LB deposition the two adjacent molecular moieties of successive layers are both either hydrophobic or hydrophilic. If, for example, it is assumed that the molecular dipole contains a hydrophobic electron donor moiety and a hydrophilic sulfonyl electron acceptor moiety and that an LB film is formed on water, the same first LB layer arrangement is created, regardless of whether Z-type or Y-type LB deposition is contemplated:

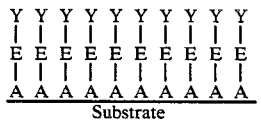

To create a Y-Type superimposed second LB layer on the first LB layer with the molecular dipoles with the same polar alignment a modified molecular dipole molecule is required in which the electron donor moiety is hydrophilic and the sulfonyl electron acceptor moiety is hydrophobic. Any and all subsequent odd numbered LB layers contain molecular dipoles chosen similarly as the first LB layer with any and all subsequent even numbered LB layers containing molecular dipoles chosen similarly as the second LB layer. Thus, a three layer LB assembly according to the examplary case in which the liquid body on which the first LB film is formed is a polar liquid, such as water, is as follows:

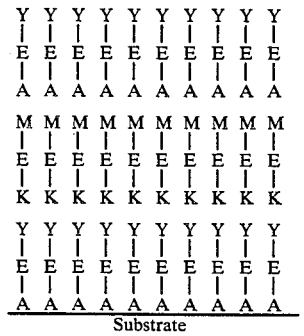

It is an important feature of this invention that through selection of the substituent R of the sulfonyl moiety $SO_2R$ the sulfonyl moiety can be either hydrophilic or hydrophobic. This permits the fabrication of a Y-Type LB film assembly containing a sulfonyl electron acceptor moiety in each layer. The construction of a comparable Y-Type LB film assembly is not possible if a conventional molecular dipole containing an electron acceptor moiety such as cyano, oxo, or nitro in place of the sulfonyl moiety.

To obtain hydrophobic electron donor and sulfonyl electron acceptor moieties for the molecular dipoles their hydrocarbon substituents, described above, can be simply left free of further substituents. Where the hydrocarbon substituent is aliphatic, it is preferred that it contains at least 6 carbon atoms, most preferably at least 10. It is possible to substitute the hydrocarbon substituents further to increase their hydrophibicity, if desired. For example, fluoro substituents are known to render even short chain length aliphatic hydrocarbons highly hydrophobic. However, extreme extreme hydrophobicity is not essential to achieving LB film formation.

To produce hydrophilic sulfonyl electron acceptor and electron donor moieties at least one of the hydrocarbon substituents forming a part of these moieties can be substituted with one or more polar groups. A large variety of polar groups are available to choose from, such groups being generally characterized by containing at least one oxygen atom in combination with one or a combination of hydrogen, nitrogen, carbon, sulfur, and phosphorus atoms. It is immaterial whether the polar groups become ionized in the supporting liquid body during LB film formation, since the groups are removed from contact with the liquid body during formation of the optical article.

Although monomolecular LB layers exhibit utility, it is preferred to construct optical articles according to this invention with at least 50 superimosed LB layers, most preferably at least a 100 layers. The number of LB layers superimposed, particularly when the more stable Y-type LB deposition is undertaken, can range as high as 5000 or more layers. In practice usually up to about 1000 LB layers are employed to form an optically active layer. LB deposition techniques are preferred for the fabrication of optically active thin films having thicknesses ranging up to about 2000 Å.

Another approach to forming optically active layers satisfying the requirements of the invention can be practiced by producing self-assembled films. The term "self-assembled" is employed to indicate that the film can be formed from successive monomolecular layers that are each spontaneously oriented on deposition. One technique for forming optically active self-assembled films satisfying the requirements of this invention can be practiced by modifying the teachings of Sagiv U.S. Pat. No. 4,539,061, here incorporated by reference. Sagiv teaches to form layers on substrates by sequential deposition. A first monomolecular layer is formed by reacting with or adsorbing on the surface of a substrate a compound consisting of a hydrocarbon linking moiety joining a bonding group and a bonding group precursor. The first layer is deposited on the substrate in a spatially oriented manner with the bonding groups adsorbed or bonded to the substrate surface and the bonding group precursors remote from the substrate surface. After the first layer is formed, the bonding group precursors remote from the substrate surface are modified so that they can provide bonding sites. A second layer can now be formed on the first layer similarly as the first layer is deposited on the substrate. After the second layer is formed, the coating sequence can be again repeated, if desired, until a film of the desired thickness is realized.

One very significant difference between the self-assembled films of this invention and those disclosed by Sagiv is that instead of a hydrocarbon linking moiety, as taught by Sagiv, this invention employs two hydrocarbon moieties joined by a molecular dipole moiety, wherein one of the bonding and precursor groups and one the hydrocarbon moieties is the substituent R of the sulfonyl electron acceptor moiety and the remaining of the bonding and precursor groups and the other hydrocarbon moiety is at least one of $R^2$, $R^3$, and $R^4$. The entire molecular dipole molecule employed to form a self-assembled film can be described by Formulae 10 or 11:

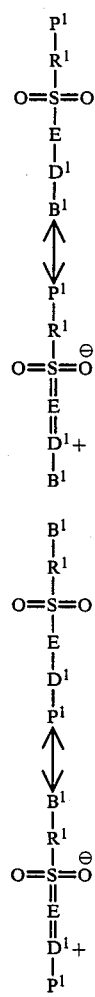

(10)

(11)

where
E is a linking moiety as previously described;
$D^1$ is an electron donor moiety differing from —$NR^2R^3$ or —$XR^4$, previously described, only by requiring that at least one of $R^2$, $R^3$, or $R^4$, when present, be further substituted with $B^1$ or $P^1$;
$R^1$ is a hydrocarbon or substituted hydrocarbon moiety differing from R, previously described, only by requiring further substitution with $B^1$ or $P^1$;
$B^1$ is a bonding group; and
$P^1$ is a bonding group precursor.

Any of the bonding groups described by Sagiv, cited above, can be employed. Among groups disclosed by Sagiv to be useful as bonding groups are the following:

(a) Silane moieties, such as monochloro, dichloro, trichlorosilanes, silanols, silazanes;
(b) Phosphate groups;
(c) Sulfate and sulfonic groups;
(d) Carboxoyl functions, such as carboxylic acids, amides, carboxoyl halides, and hydrazides;
(e) Amino and hydrazino groups;
(f) Hydroxyl groups;
(g) Boronic acid groups;
(h) Aldehyde groups;
(i) Halides;
(j) Diazonium salt moieties; and
(k) Pyridine moieties.

Sagiv discloses a large variety of bonding group precursors and varied techniques for their conversion to bonding groups. Such bonding group precursors and conversion techniques can be employed to the extent that they are compatible with the preservation of the molecular dipole. In general, however, the draconian approaches (e.g., ozonolysis) suggested by Sagiv are incompatible with preservation of the molecular dipoles of this invention.

In a preferred form $P^1$ can take the form of a precursor that can be hydrolyzed under relatively mild conditions to provide a hydroxy functional group. Many of the conventional techniques for forming alcohols can be employed. For example, when the bonding group precursor is a halide substituent, the halide can be readily displaced by hydrolysis to provide a hydroxy group. Ester, amide, alkylthio, arylthio, aryloxy, and alkoxy groups can also be readily hydrolyzed by known techniques to create a hydroxy substituent on the hydrocarbon of the molecular dipole.

In a specifically preferred form of the invention the substrate chosen for the construction of self-assembled film is an optically transparent siliceous support, such as quartz or glass. Siliceous supports are known to exhibit hydroxyl groups at their surface. A monomolecular layer of a compound satisfying Formula 10 or 11 is spread on the siliceous substrate. The preferred bonding group is -$SiCl_3$. Reaction of the bonding group with the substrate in the presence of water produces a first layer of the following structure:

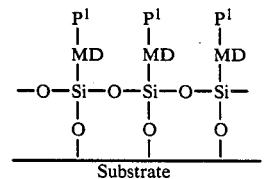

where
RD represents —$R^1$—$SO_2$—E—$D^1$— defined above in connection with Formulae 10 and 11 and
$P^1$ is preferably a bonding group precursor that can be employed to form a hydroxy group by hydrolysis.

When the bonding group precursor is converted to a hydroxy group, a second layer similar to the first can be formed on the substrate. By repeating this sequence of steps any desired number of layers can be formed. The following illustrates a preferred self-assembled film formed by three successive depositions:

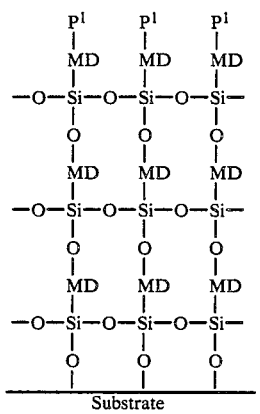

It is immaterial whether $P^1$ in the final layer remains as a bonding group precursor or is converted to a hydroxyl group.

Optically active layers in the same thickness ranges noted above in connection with LB films can be produced. Since crosslinking of each monomolecular layer formed is possible with proper bonding group selection, even thicker and more stable optically active layers can be produced, if desired.

Where relatively thick optically active elements, such as those greater than about 2000 Å in thickness and particularly those greater than 1 μm in thickness, are desired, forming the optically active layer in successive monomolecular deposition sequences can be time consuming. Therefore thicker optically active elements according to the invention are preferably constructed by macroscopic construction techniques—that is, construction techniques that are capable of forming many or all molecular layers of the optically active element simultaneously and therefore do not require repetition as a function of the number of molecular layers.

One preferred macroscopic construction approach is to pattern (e.g., spin cast or otherwise suitably shape) a fluid containing the molecular dipole in an unordered state, align (pole) the molecular dipoles in an externally applied electric field, and convert the fluid to a viscous or solid form capable of holding the molecular dipoles in polar alignment when the external field is no longer present. A number of different variations on this general approach are possible.

If desired, the molecular dipoles of this invention can be formed into an optically active element by placing the molecular dipole in a transparent polymeric binder, raising the temperature of the binder above its glass transition temperature, externally applying an electric field (also commonly referred to as poling) to align the molecular dipoles in the polymer, and then cooling the optically active element below the glass transition temperature of the polymer with the external field still applied. When the external field is removed, the molecular dipoles will remain in polar alignment. The specific technique described by Singer et al, cited above and here incorporated by reference, can be employed, wherein poly(methyl methacrylate is employed as a binder). This technique is generally useful with transparent linear polymers. The term "transparent" is employed throughout, unless otherwise stated, to indicate minimal adsorption of electromagnetic radiation at wavelengths supplied to or generated within the optical articles of this invention. Useful transparent linear polymers can be selected from a wide variety of such polymers known to be useful in the construction of transparent films. Such linear polymers include cellulose nitrate and cellulose esters, such as cellulose triacetate and cellulose diacetate; polystyrene; nylons and piolyamides; homo- and co-polymers of vinyl chloride; polyaldehydes—e.g., poly(vinyl acetal), poly(vinyl butyral), etc.; polycarbonates; homo- and co-polymers of olefins, particularly α-olefins, such as polyethylene and polypropylene; polyesters of dibasic aromatic carboxylic acids with divalent alcohols, such as poly(ethylene terephthalate); synthetic rubbers—e.g., homo- and co-polymers of butadiene; high molecular weight alkylene oxides—e.g., ethylene glycols having weight average molecular weights of from 4000 to 4,000,000; poly(vinyl esters)—e.g., poly(vinyl acetate); acrylonitriles and methacrylonitriles; and acrylic and methacrylic acid esters—e.g., poly(methyl metacrylate), poly(methyl acrylate), as well as their copolymers and homologues.

In the foregoing macroscopic assembly technique the externally applied field acts primarily on the molecular dipoles to achieve their polar alignment. An important variation of this assembly technique is to employ linear polymers having pendant groups which are capable of being aligned by the externally applied electric field. Since both the pendant groups and the externally applied electric field act on the molecular dipoles, a higher order of polar alignment for a selected field gradient can be achieved or, alternatively, the same order of polar alignment can be achieved with a lower field gradient.

Linear polymers which are capable of supplementing the electric field in aligning the molecular dipoles in the externally applied field are characterized by linear (non-crosslinked) backbones, dipolar pendant groups, and a linkage of each dipolar pendant group with the polymer backbone which permits spatial reorientation of the pendant group independently of the orientation of the polymer backbone. These molecular requirements describe the characteristics of polymers known to form liquid crystals. In the parlance of liquid crystals, the liquid crystal polymer acts as a host while the molecular dipole acts as guest in the liquid crystal medium. In a preferred form, liquid crystal polymers contain a linear backbone formed by vinyl addition. The dipolar pendant groups are aromatic groups ring substituted with both electron withdrawing and electron donating substituents. Such substituents can be selected by reference to published Hammett sigma values, as described above. The combined effect of the substituents on the aromatic ring is to create a dipole moment in the pendant group. The planar nature of the aromatic rings allows close packing densities with minimal steric hindrances. Preferred linking groups are linear divalent alkylene moieties of from about 1 to 12, optimally 4 to 10, carbon atoms, since they permit the pendant groups freedom of orientation with respect to the polymer backbone with minimal increase in molecular weight.

Specifically preferred polymers of this type are acrylate and methacrylate homo- and co-polymers in which the omega carbon atom of an alkyl ester forming group is substituted with an aromatic dipolar pendant group. These and closely related polymers illustrated by Formula 12:

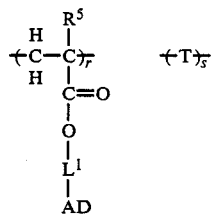

(12)

where
- AD is an aromatic dipolar substituent;
- $L^1$ is a divalent linking group containing a —(CH$_2$)-$_m$—moiety;
- m is an integer of from 1 to 12, preferably 4 to 10;
- $R^5$ is hydrogen, halogen, or alkyl of from 1 to 6 carbon atoms;
- r is 1.0 to 0.5;
- s is 0 to 0.5; and
- T is a repeating unit derived from a vinyl addition monomer.

The aromatic dipolar substituent AD can take any one or combination of the forms:

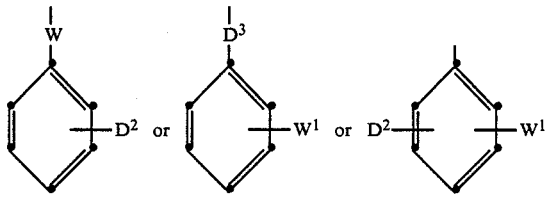

where
- $D^2$ and $D^3$ are monovalent and divalent groups, respectively, exhibiting negative Hammett sigma values and
- W and $W^1$ are divalent and monovalent groups, respectively, exhibiting positive Hammett sigma values.

The following are illustrative of suitable liquid crystal polymers contemplated for use as binders in the optical articles of this invention:

LC-1  Poly{6-[4-(4-cyanophenoxycarbonyl)phenoxy]hexyl methacrylate-co-6-[4-(4-methoxyphenoxycarbonyl)phenoxy]hexyl methacrylate} (50:50)

LC-2  Poly{4-[4-(4-carboxyphenoxycarbonyl)phenoxy]butyl acrylate-co-4-[4-(4-methoxyphenoxycarbonyl)phenoxy]butyl acrylate} (60:40)

LC-3  Poly{10-[4-(4-nitrophenoxycarbonyl)phenoxy]decyl methacrylate-co-6-[4-(4-phenoxycarbonyl)phenoxy]hexyl methacrylate} (40:60)

LC-4  Poly{6-[4-(4-cyanophenoxycarbonyl)phenylthio]hexyl methacrylate-co-methyl methacrylate} (70:30)

Generally concentrations of molecular dipole of at least about 1 percent (preferably at least 10 percent) by weight, based on the weight of the binder forming the transmission medium are contemplated. Total weight of the transmission medium are contemplated.

In addition to allowing macroscopic assembly the technique of achieving polar alignment above the glass transition temperature of a polymeric binder followed by cooling exhibits the advantages of permitting an extremely wide choice of R, $R^2$, $R^3$, and $R^4$ substituents as well as a broad choice of linear polymers, including but not limited to liquid crystals. The polymers lend themselves to the formation of optically active films by spin casting.

An important disadvantage of macroscopic assembly by dissolving a molecular dipole in a separate polymeric binder is the limited concentration of the molecular dipole that can be achieved. Because of the limited solvent capabilities of linear polymers and the risk of phase separation, including as a worst case crystallization of the molecular dipole as a separate phase on cooling, the concentration of the molecular dipole in the binder cannot normally exceed about 20 percent by weight, based on the weight of the binder. A further disadvantage is that ratio of polymeric binder to molecular dipole can vary from one preparation to the next, allowing for performance variances from one optical article to the next, unless this ratio is carefully controlled.

One preferred technique for the macroscopic assembly of molecular dipoles in polar alignment is taught by Scozzafava et al "An Optical Article Containing A Transmission Medium Exhibiting a High Level of Second Order Polarization Susceptibility", Ser. No. 101,897, concurrently filed and commonly assigned. As therein disclosed, The molecular dipoles are held in polar alignment in a crosslinked polymeric binder to form the optically active transmission medium. The molecular dipoles are dissolved in a fluid precursor of the binder, such as a monomer or oligomer capable of polymerizing to form a crosslinked polymer or a linear polymer capable of crosslinking to form a crosslinked binder. The molecular dipoles are aligned (poled) in an externally applied DC electric field, and crosslinking is undertaken with the field still applied.

It is an advantage of this approach that it not necessary at any time to heat the materials above ambient temperatures, although mild heating is not incompatible. It is further important to note that the linear polymers employed as binder precursors are to be distinguished from the linear polymers previously employed as binders in the art. Whereas the prior art linear polymer binders must be so highly viscous as to be apparently solid at room temperatures, the linear polymers employed in the practice of this invention as binder precursors can be and preferably are relatively low viscosity liquids at room temperatures. In addition to avoiding any necessity of heating prior to or during poling, the lower molecular weight linear polymers are capable of dissolving higher proportions of the molecular dipoles than are the relatively higher molecular weight linear polymer binders of the prior art.

While any convenient technique can be employed for converting the binder precursor into a crosslinked binder, photocrosslinking is preferred. As employed herein the term "photocrosslinking" is employed to designate a reaction stimulated by exposure to electromagnetic radiation that either converts photosensitive monomers into crosslinked polymers or crosslinks linear photosensitive polymers. Useful photosensitive binder precursors capable of producing crosslinked polymeric binders can be chosen from among those employed in conventional negative working photoresist compositions.

Diazo resins are photosensitive linear polymers specifically contemplated for use as binder precursors. Many water soluble radiation sensitive diazo resins are useful. Particularly contemplated are low molecular weight diazo resins which are acid condensation products of a diazonium salt of p-aminodiphenylamine, such as diphenylamine-4-diazonium halide or diphenylamine-4-diazonium phosphate, condensed in acid with aldehydes such as paraformaldehyde or formaldehyde and converted to a double metal salt, such as chlorozincate or fluoroborate. These resins are well known in the art and are described, for example, by Kosar, *Light Sensitive Systems*, pp. 323–324, John Wiley and Sons, NY, NY (1965). One particularly suitable diazo resin composition is the composition described in "Continuous-Toned Dyed Diazo Imaging Elements", *Research Disclosure*, Vol. 169, Item 16976, May 1978, here incorporated by reference.

In one preferred form of the invention the binder precursor is a monomer, oligomer, or linear polymer containing containing ethylenic unsaturation that is photostimulated to undergo a crosslinking or hardening reaction. For example, any of the monomeric or crosslinkable polymeric film forming components disclosed in Jenkins et al and Heseltine et al U.S. Pat. No. Re. 27,925 or No. Re. 27,922, respectively, are suitable for use in forming the crosslinked polymeric binders employed in the practice of this invention. Tan et al U.S. Pat. No. 4,289,842, here incorporated by reference, discloses negative working hardenable imaging compositions containing light sensitive acrylate copolymers containing pendant groups, such as alkenyl groups with ethylenic unsaturation. Lindley U.S. Pat. No. 4,590,147, here incorporated by reference, discloses vinyl oligomers which can be employed as film forming components in the hardenable imaging compositions of this invention. Useful film forming components containing vinyl monomers are disclosed in Fuerniss U.S. Pat. No. 4,497,889 and Anderson et al U.S. Pat. No. 4,535,052, both here incorporated by reference. Kosar *Light Sensitive Systems*, John Wiley & Sons, 1965, further describes a variety of useful film forming components for use in the practice of this invention, including ethylenically unsaturated monomers and polymers.

Because of their superior properties, including exceptionally high levels of optical transparency within the visible portion of the spectrum and ease of handling and polymerizing, preferred binder precursors are $\alpha,\beta$-ethylenically unsaturated monomers. Useful $\alpha,\beta$-ethenically unsaturated monomers are derived from:

1. polyfunctional aromatic or aliphatic acids such as 1,3,5-benzenetricarboxylic acid, 1,4-benzenedicarboxylic acid, 1,3-benzenedicarboxylic acid, 1,3-naphthalenecarboxylic acid, 1,2,4-benzenetricarboxylic acid, 1,2-benzenedicarboxylic acid, 1,2,3-benzenetricarboxylic acid, 1,2,4,5-benzenetetracarboxylic acid, 1,2,3,5-benzenetetracarboxylic acid, 1,4-cyclohexanedicarboxylic acid, 1,3-cyclohexanedicarboxylic acid, 1,3,5-cyclohexanetricarboxylic acid, 1,2-cyclohexanedicarboxylic acid, 1,2,4-cyclohexanetricarboxylic acid, 1,2,3-cyclohexanetricarboxylic acid, 1,2,4,5-cyclohexanetetracarboxylic acid, 1,2,3,5-cyclohexanetetracarboxylic acid, 1,2,4-cyclohexanetetracarboxylic acid and their derivatives.

2. polyfunctional aromatic or aliphatic alcohols such as 1,2,3-benzenetriol, 1,2,4-benzenetriol, 1,3,5-benzenetriol, 1,2-benzenediol, 1,3-benzenediol, 1,4-benzenediol, 1,2,3-cyclohexanetriol, 1,2,4-cyclohexanetriol, 1,3,5-cyclohexanetriol, 1,2-cyclohexanediol, 1,4-cyclohexanediol.

3. polyfunctional polynuclear aromatic or aliphatic alcohols such as hydrogenated bisphenol A, bisphenols with long chain bridges such as butylene, heptylene, hexylene, octadecylene and the like.

4. polyfunctional polynuclear aromatic or aliphatic acids such as phenylindanedicarboxylic acid, hydrogenated phenylindanedicarboxylic acid, 4,4′-isopropylidenedibenzoic acid, 4,4′-isopropylidenedicyclohexanoic acid.

5. and other polymerizable crosslinkable monomers that can be coated with or without a solvent and crosslinked to yield an insoluble film with suitable electrical properties for use as a barrier layer.

The polymerizable crosslinkable monomers prepared from the above polyfunctonal nuclei, can be mixed in certain proportion with monofunctional polymerizable monomers to control certain physical properties such as viscosity, flexibility, curing speed, and adhesion.

Useful $\alpha,\beta$-ethylenically unsaturated monofunctional monomers include benzoyloxyethyl acrylate, benzoyloxypropyl acrylate, benzoyloxypentyl acrylate, benzoyloxybutyl acrylate, benzoyloxyhexyl acrylate, benzoyloxyethyl methacrylate, benzoyloxypropyl methacrylate, benzoyloxybutyl methacrylate, benzoyloxypentyl methacrylate and benzoyloxyhexyl methacrylate, phenyl acrylate, phenyl methacrylate, cyclohexyl acrylate, cyclohexyl methacrylate, cyclohexyloyloxethyl acrylate, cyclohexyloyloxypropyl acrylate, cyclohexyloyloxyhexyl acrylate and combinations of these monomers.

Particularly preferred $\alpha,\beta$-ethylenically unsaturated monomers are those having carbonyl-containing substituents. In a specifically preferred form such monomers satisfy Formula 13:

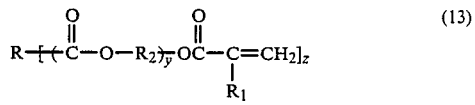

(13)

wherein

R represents a cycloaliphatic (e.g., cyclohexyl or an aromatic (e.g., naphthyl or phenyl) group;

$R_1$ represents hydrogen or alkyl of from 1 to 6 carbon atoms, preferably hydrogen or methyl;

$R_2$ repesents alkylene of 1 to 20 carbon atoms (preferably 1 to 10 carbon atoms), or —CH$_2$CH$_2$(OCH$_2$CH$_2$)$_x$;

x is 1 to 20, preferably 1 to 6;

y is 0 or 1; and z is 2 to 6, preferably 2 to 4.

Representative examples of such monomers are presented in Table I below.

TABLE I
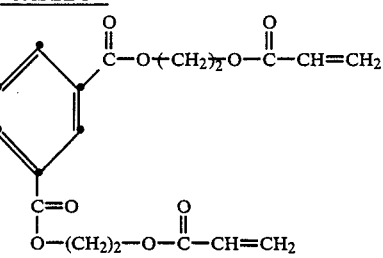
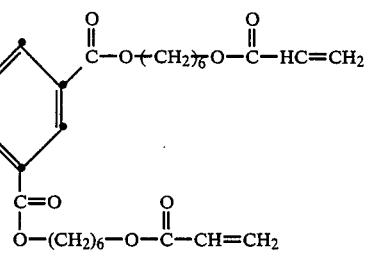
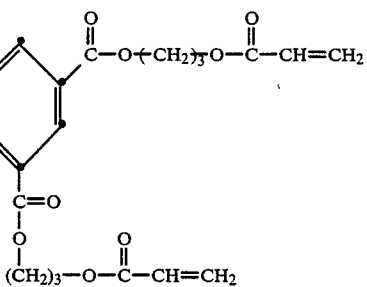
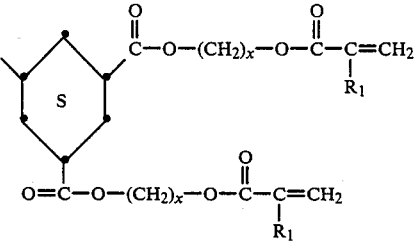
$R_1 = H, CH_3;$
$x =$ one to 6.
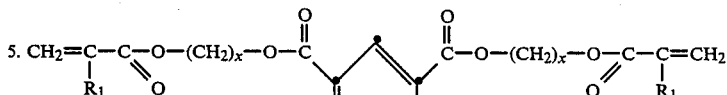
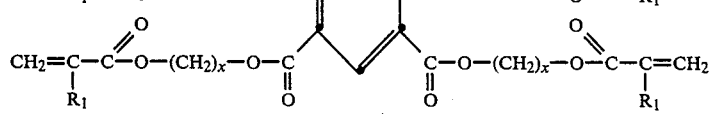
$R_1 = H, CH_3;$
$x =$ one to 6.
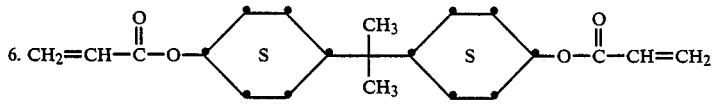
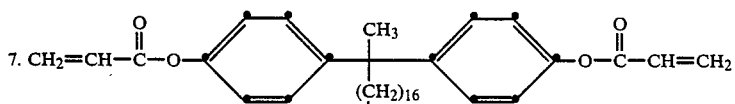

TABLE I
-continued

8. 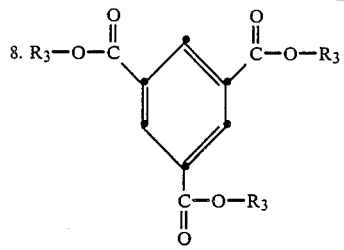

$R_1 = H, CH_3;$
$x = 1 \text{ to } 10;$ $R_3 = CH_2CH_2(OCH_2CH_2)_x-O-\overset{O}{\underset{\|}{C}}-\overset{R_1}{\underset{|}{C}}=CH_2$ The photosensitive binder precursors can be crosslinked by direct exposure to higher energy (e.g., shorter wavelength) electromagnetic radiation, such as UV radiation. To permit crosslinking by exposure to electromagnetic radiation in the near UV (290 to 390 nm) and visible portions of the spectrum, there is incorporated in the composition containing the molecular dipole and photosensitive binder precursor one or a combination of compounds acting as initiators. In a specifically preferred form two coinitiators, an activator and a photosensitizer are employed in combination.

Any of the photosensitizers and initiators disclosed in Molaire U.S. Pat. No. 4,322,490, Molaire et al U.S. Pat. No. 4,619,890, and Scozzafava et al U.S. Pat. No. 4,485,161, here incorporated by reference, can be employed in the practice of this invention.

Specht and Farid U.K. No. 2,083,832A, here incorporated by reference, discloses as coinitiators zinium activators and amino-substitued 3-ketocoumarin and naphthothiazole merocyanine photosensitizers which are useful in promoting photocrosslinking in the near UV and blue portions of the spectrum.

Preferred coinitiators for photocrosslinking by exposure to electromagnetic radiation of wavelengths longer than 400 nm are the specific subject matter of commonly assigned, copending filings, Farid et al U.S. Ser. Nos. 933,657; 933,658, 933,660, and 933,712, each filed Nov. 21, 1986. Farid et al teaches to employ azinium salt activators in combination with dye photosensitizers. The azinium salt activators can take any convenient conventional form. The azinium activators disclosed by Heseltine et al and Jenkins et al U.S. Pat. Nos. Re. 27,922 and No. Re. 27,925, Specht and Farid U.K. No. 2,083,832A, and Research Disclosure, Vol. 200, December 1980, Item 20036, cited above, provide a variety of examples of useful azinium activators.

The azinium activators include an azinium nucleus, such as a pyridinium, diazinium, or triazinium nucleus. The azinium nucleus can include one or more aromatic rings, typically carbocyclic armatic rings, fused with an azinium ring. In other words, the azinium nuclei include quinolinium, isoquinolinium, benzodiazinium, and naphthodiazonium nuclei. To achieve the highest attainable activation efficiencies per unit of weight it is preferred to employ monocyclic azinium nuclei.

The azinium activators include a quaternizing substituent, which is preferably an oxy (e.g., alkoxy or aryoxy) or acyl radical containing from 1 to 18, preferably 1 to 8 carbon atoms. The highest activity azinium salts are those containing an oxy quaternizing substituent containing 1 or 2 carbon atoms. Other substituents to the azinium ring are not required, but can be present.

The dye photosensitizers can be selected from among any known dye class, provided they exhibit a reduction potential which in relation to that of the azinium activator is at most 0.1 volt more positive. Among specifically contemplated dye classes from which dyes can be selected are coumarin (including ketocoumarin and sulfonocoumarin) dyes, merocyanine dyes, merostyryl dyes, oxonol dyes, and hemioxonol dyes. Dyes from each of the foregoing classes all contain a keto group in the blue absorbing chromophore and are all therefore designated keto dyes. In addition, it is a specific recognition of this invention that a dye photosensitizer useful in the practice of this invention need not be a keto dye. That is, a keto group in the blue absorbing chromophore of the dye is not essential. Non-keto dyes embrace a variety of dye classes, including non-keto polymethine dyes, rhodamine dyes, anthracene dyes, acridine dyes, aniline dyes, and azo dyes. Non-keto polymethine dyes include cyanine, hemicyanine, and styryl dyes.

In one preferred form the dye photosensitizers are chosen from the polymethine dye class, which includes the cyanines, merocyanines, complex cyanines and merocyanines (i.e., tri-, tetra- and poly-nuclear cyanines and merocyanines), oxonols, hemioxonols, styryls, merostyryls, and streptocyanines.

The cyanine dyes include, joined by a methine linkage, two basic heterocyclic nuclei, such as azolium or azinium nuclei, for example, those derived from pyridinium, quinolinium, isoquinolinium, oxazolium, thiazolium, selenazolium, indazolium, pyrazolium, pyrrolium, indolium, 3H-indolium, imidazolium, oxadiazolium, thiadioxazolium, benzoxazolium, benzothiazolium, benzoselenazolium, benzotellurazolium, benzimidazolium, 3H- or 1H-benzoindolium, naphthoxazolium, naphthothiazolium, naphthoselenazolium, naphthotellurazolium, carbazolium, pyrrolopyridinium, phenanthrothiazolium, and acenaphthothiazolium quaternary salts.

Exemplary of the basic heterocyclic nuclei are those satisfying Formulae 14 and 15.

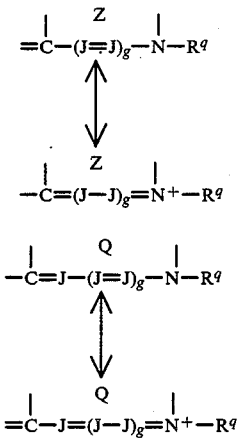

Formula 14

Formula 15 where

Z represents the elements needed to complete a cyclic nucleus derived from basic heterocyclic nitrogen compounds such as oxazoline, oxazole, benzoxazole, the naphthoxazoles (e.g., naphth[2,1-d]oxazole, naphth[2,3-d]oxazole, and naphth[1,2-d]oxazole), oxadiazole, thiazoline, thiazole, benzothiazole, the naphthothiazoles (e.g., naphtho[2,1-d]thiazole), the thiazoloquinolines (e.g., thiazolo[4,5-b]quinoline), phenanthrothiazole, acenaphthothiazole, thiadioxazole, selenazoline, selenazole, benzoselenazole, the naphthoselenazoles (e.g., naphtho[1,2-d]selenazole), benzotellurazole, naphthotellurazoles (e.g., naphtho[1,2-d]tellurazole), imidazoline, imidazole, benzimidazole, the naphthimidazoles (e.g., naphth[2,3-d]imidazole), 2- or 4-pyridine, 2- or 4-quinoline, 1- or 3-isoquinoline, benzoquinoline, 3H-indole, 1H- or 3H-benzoindole, and pyrazole, which nuclei may be substituted on the ring by one or more of a wide variety of substituents such as hydroxy, the halogens (e.g., fluoro, chloro, bromo, and iodo), alkyl groups or substituted alkyl groups (e.g., methyl, ethyl, propyl, isopropyl, butyl, octyl, dodecyl, octadecyl, 2-hydroxyethyl, 3-sulfopropyl, carboxymethyl, 2-cyanoethyl, and trifluoromethyl), aryl groups or substituted aryl groups (e.g., phenyl, 1-naphthyl, 2-naphthyl, 4-sulfophenyl, 3-carboxyphenyl, and 4-biphenylyl), aralkyl groups (e.g., benzyl and phenethyl), alkoxy groups (e.g., methoxy, ethoxy, and isopropoxy), aryloxy groups (e.g., phenoxy and 1-naphthoxy), alkylthio groups (e.g., methylthio and ethylthio), arylthio groups (e.g., phenylthio, p-tolylthio, and 2-naphthylthio), methylenedioxy, cyano, 2-thienyl, styryl, amino or substituted amino groups (e.g., anilino, dimethylamino, diethylamino, and morpholino), acyl groups, (e.g., formyl, acetyl, benzoyl, and benzenesulfonyl);

Q represents the elements needed to complete a cyclic nucleus derived from basic heterocyclic nitrogen compounds such as pyrrole, indole, carbazole, benzindole, pyrazole, indazole, and pyrrolopyridine;

$R^q$ represents alkyl groups, aryl groups, alkenyl groups, or aralkyl groups, with or without substituents, (e.g., carboxy, hydroxy, sulfo, alkoxy, sulfato, thiosulfato, phosphono, chloro, and bromo substituents);

J is in each occurrence independently selected to represent a substituted or unsubstituted methine group—e.g., —$CR^6$= groups, where $R^6$ represents hydrogen when the methine group is unsubstituted and most commonly represents alkyl of from 1 to 4 carbon atoms or phenyl when the methine group is substituted; and g is 0 or 1.

Cyanine dyes can contain two heterocyclic nuclei of the type shown in Formula 14 joined by a methine linkage containing an uneven number of methine groups or can contain a heterocyclic nucleus according to each of formulae 14 and 15 joined by a methine linkage containing an even number of methine groups, where the methine groups can take the form —$CR^1$= as described above. The greater the number of the methine groups linking nuclei in the polymethine dyes in general and the cyanine dyes in particular the longer the absorption wavelengths of the dyes. For example, dicarbocyanine dyes (cyanine dyes containing five methine groups linking two basic heterocyclic nuclei) exhibit longer absorption wavelengths than carbocyanine dyes (cyanine dyes containing three methine groups linking two basic heterocyclic nuclei) which in turn exhibit longer absorption wavelengths than simple cyanine dyes (cyanine dyes containing a single methine group linking two basic heterocyclic nuclei). Carbocyanine and dicarbocyanine dyes are longer wavelength dyes while simple cyanine dyes are typically yellow dyes, but can exhibit absorption maxima up to about 550 nm in wavelength with proper choice of nuclei and other components capable of bathochromically shifting absorption.

One of the techniques for bathochromically shifting the absorption maxima of polymethine dyes in general and cyanine dyes in particular is to include in the methine linkage an oxocarbon bridging nucleus. Exemplary oxocarbon bridging nuclei can take any of the forms indicated by formula 16.

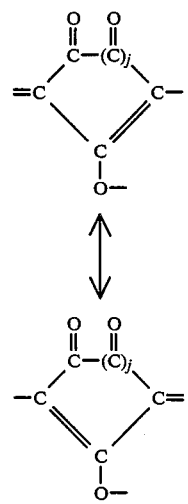

Formula 16 wherein j is the integer 0, 1, or 2.

Merocyanine dyes link one of the cyanine dye type basic heterocyclic nuclei described above to an acidic keto methylene nucleus through a methine linkage as described above, but containing zero, two, or a higher even number of methine groups. Zero methine dyes, those containing no methine groups in the linkage between nuclei, exhibit a double bond linkage between the nuclei in one resonance form and a single bound linkage in another resonance form. In either resonance form the linkage sites in the nuclei are formed by methine groups forming a part of each nucleus. Zero methine polymethine dyes are yellow dyes.

Exemplary acidic nuclei are those which satisfy Formula 17.

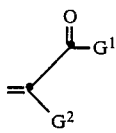

Formula 17 where
G¹ represents an alkyl group or substituted alkyl group, an aryl or substituted aryl group, an aralkyl group, an alkoxy group, an aryloxy group, a hydroxy group, an amino group, or a substituted amino group, wherein exemplary substituents can take the various forms noted in connection with Formulae 1 and 2;
G² can represent any one of the groups listed for G¹ and in addition can represent a cyano group, an alkyl, or arylsulfonyl group, or a group represented by

or G² taken together with G¹ can represent the elements needed to complete a cyclic acidic nucleus such as those derived from 2,4-oxazolidinone (e.g., 3-ethyl-2,4-oxazolidindione), 2,4-thiazolidindione (e.g., 3-methyl-2,4-thiazolidindione), 2-thio-2,4-oxazolidindione (e.g., 3-phenyl-2-thio-2,4-oxazolidindione), rhodanine, such as 3-ethylrhodanine, 3-phenylrhodanine, 3-(3-dimethylaminopropyl)rhodanine, and 3-carboxymethylrhodanine, hydantoin (e.g., 1,3-diethylhydantoin and 3-ethyl-1-phenylhydantoin), 2-thiohydantoin (e.g., 1-ethyl-3-phenyl-2-thiohydantoin, 3-heptyl-1-phenyl-2-thiohydantoin, and arylsulfonyl-2-thiohydantoin), 2-pyrazolin-5-one, such as 3-methyl-1-phenyl-2-pyrazolin-5-one, 3-methyl-1-(4-carboxybutyl)-2-pyrazolin-5-one, and 3-methyl-2-(4-sulfophenyl)-2-pyrazolin-5-one, 2-isoxazolin-5-one (e.g., 3-phenyl-2-isoxazolin-5-one), 3,5-pyrazolidindione (e.g., 1,2-diethyl-3,5-pyrazolidindione and 1,2-diphenyl-3,5-pyrazolidindione), 1,3-indandione, 1,3-dioxane-4,6-dione, 1,3-cyclohexanedione, barbituric acid (e.g., 1-ethylbarbituric acid and 1,3-diethylbarbituric acid), and 2-thiobarbituric acid (e.g., 1,3-diethyl-2-thiobarbituric acid and 1,3-bis(2-methoxyethyl)-2-thiobarbituric acid).

Useful hemicyanine dyes are essentially similar to the merocyanine dyes described above, differing only in substituting for the keto methylene group of Formula 17 the group shown below in Formula 18.

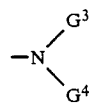

Formula 18 where
G³ and G⁴ may be the same or different and may represent alkyl, substituted alkyl, aryl, substituted aryl, or aralkyl, as illustrated for ring substituents in Formula 1 or G³ and G⁴ taken together complete a ring system derived from a cyclic secondary amine, such as pyrrolidine, 3-pyrroline, piperidine, piperazine (e.g., 4-methylpiperazine and 4-phenyl-piperazine), morpholine, 1,2,3,4-tetrahydroquinoline, decahydroquinoline, 3-azabicyclo[3,2,2]nonane, indoline, azetidine, and hexahydroazepine.

Useful hemioxonol dyes exhibit a keto methylene nucleus as shown in Formula 19 and a nucleus as shown in Formula 20 joined by a methine linkage as previously described containing one or a higher uneven number of methine groups.

Useful merostyryl dyes exhibit a keto methylene nucleus as shown in Formula 17 and a nucleus as shown in Formula 19 joined by a methine linkage as described above containing one or a higher uneven number of methine groups.

Formula 19 where
G³ and G⁴ are as previously defined.

The cyanine, merocyanine, hemicyanine, hemioxonol, and merostyryl dyes described above are intended to be illustrative of the simpler structural forms of useful polymethine dyes. It is generally recognized that substituents can join the nuclei and methine linkages to form additional cyclic structures. Further, the dyes can contain three or more nuclei. For example, by substituting a merocyanine dye in its methine linkage with a second basic heterocyclic nucleus of the cyanine dye type an allopolar cyanine dye can be formed. Further, the various substituents not forming a part of the dye chromophore can be varied as desired to tailor dye physical properties, particularly hydrophobicity and hydrophillicity, to suit the particular film forming components employed. By choosing as the aliphatic moieties of the dyes hydrocarbon groups having more carbon atoms (e.g., from about 6 to 20 carbon atoms) the dyes can be rendered more oleophilic while hydrocarbon groups containing fewer numbers of carbon atoms (e.g., 1 to 5 carbon atoms) and particularly those bearing polar substituents render the dyes more hydrophilic. The aromatic moieties of the dyes typically contain from 6 to 10 carbon atoms.

When employing as coinitiators azinium activators and dye photosensitizers, the azinium activator is preferably present in a concentration of from $2 \times 10^{-5}$ to $25 \times 10^{-5}$, most preferably from about $5 \times 10^{-5}$ to $20 \times 10^{-5}$, mole per gram of the binder precursor.

The photosensitizer can be present in any concentration capable of increasing the response of the binder precursor composition including the activator to visible light. While the photosensitizer concentration can vary widely, it is generally contemplated to employ photosensitizer in concentrations ranging from about $5 \times 10^{-7}$ to $1 \times 10^{-4}$ mole per gram of binder precursor. Preferred photosensitizer concentrations are in the range of from $10^{-6}$ to $5 \times 10^{-5}$ mole per gram of binder precursor, with optimum concentrations generally being in the range of from about $2 \times 10^{-6}$ to $2 \times 10^{-5}$ mole per gram of binder precursor.

The concentration of the molecular dipoles in the crosslinked polymeric binder can be widely varied. In most instances it is preferred that the molecular dipole be present in a concentration of at least 1 percent, based on the weight of crosslinked polymeric binder. It is generally preferred that the molecular dipole be present in a concentration of at least 10 percent by weight, based on the weight of the crosslinked polymeric binder. To increase the hyperpolarizability density ($\beta/V$, where V is the volume of the transmission medium) generally the highest attainable concentration of the molecular dipole in the crosslinked polymeric binder is sought. This is a function of the solubility of the molecular dipole in the binder precursor, both before and during crosslinking. For example, concentrations so high as to produce phase separation of he molecular dipole and binder precursor are to be avoided. Molecular dipole concentrations of up to 50 percent, based on the weight of the crosslinked polymeric binder, may be obtained with the most highly compatible combinations of molecular dipoles and polymeric binders, with molecular dipole concentrations of at least 20 percent, based on the weight of the crosslinked polymeric binder, being generally attainable.

The choice of initiators for photocrosslinking is related to the wavelengths of electromagnetic propagation sought in the optical article. To facilitate crosslinking the initiators preferably exhibit absorption maxima in the spectral regions where the binder precursor is transparent. Since $\alpha,\beta$-ethylenically unsaturated binder precursors, particularly those containing acrylic and methacrylic crosslinking groups, are highly transparent in the visible region of the spectrum, the use of dye photosensitizers as coinitiators is highly advantageous. While any residual photosensitizer remaining the crosslinked polymeric binder will absorb light in the visible spectrum in the completed optical article, the concentrations of the photosensitizers are in general too low to exhibit any significant elevation of internal energy losses in the optically active transmission media.

Another preferred technique for the macroscopic assembly of molecular dipoles in polar alignment is taught by Robello et al, "An Optical Article Containing a Polymeric Matrix Exhibiting a High Level of Second Order Polarization Susceptibility", Ser. No. 101,886, concurrently filed and commonly assigned. As therein taught, the molecular dipoles each contain at least one crosslinking moiety. This permits a separate binder to be eliminated or employed on a optional basis. The molecular dipoles while being held in polar alignment in an externally applied field can be crosslinked to form a rigid crosslinked polymeric matrix.

The molecular dipoles can be generally represented by Formula Pair 20:

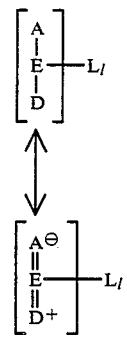
(20)

where
A is a sulfonyl electron acceptor moiety;
D is an electron donor moiety;
E is a linking moiety, specifically a conjugated $\pi$ bonding system, which provides a pathway for charge transfer resonance;
l is an integer of from 1 to 4; and
L is a crosslinking moiety.

For the molecular dipoles to form a crosslinked polymeric matrix it is necessary that they be linked in polar alignment to at least three adjacent molecular dipoles. For this to be achieved each molecular dipole requires at least one crosslinking moiety L. Where a single crosslinking moiety is provided for ech molecular dipole, the crosslinking moiety must itself be capable of linking at least three adjacent molecular dipoles in order to form a crosslinked polymeric matrix. This has been illustrated above by the siloxy groups in the self-assembled layers.

A preferred approach for achieving macroscopic construction of an optically active transmission medium is to employ molecular dipoles which are monomers each containing two or more photopolymerizable substituent groups. Flexible linkages are required in the molecule so that the photopolymerizable substituent groups are allowed freedom of orientation while the molecular dipole remains in polar alignment with the externally applied electric field.

The photopolymerizable substituent groups can be viewed as substituents of or replacements for any one of the various groups R, $R^2$, $R^3$, $R^4$, $R^a$, and $R^b$ in the molecular dipoles described above satisfying the requirements of the invention. Since the sulfonyl electron acceptor moiety differs from conventional electron acceptor moieties known to the art, such as nitro and cyano groups in providing a substitution site, unique crosslinking patterns are made possible by the sulfonyl moiety. Exemplary forms of molecular dipole repeating units derived from dipole monomers according to this invention containing two polymerizable substituent groups, at least one of which is joined through the sulfonyl moiety, are illustrated by Formula Pairs 21 through 24. Dipole monomers containing three or four photopolymerizable substitutent groups differ from those illustrated only by the number of substituent groups present which are substituted by crosslinking groups.

(21) 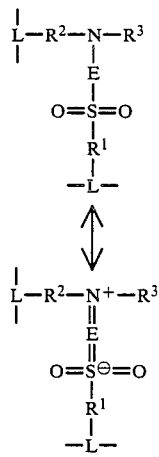

(22) 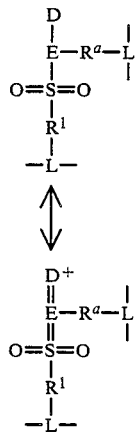

(23) 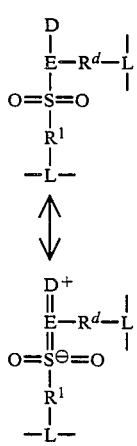

(24) 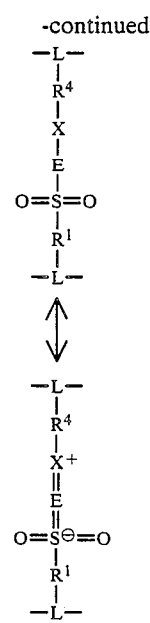

where
E, D, and L are as previously defined and
$R^a$, $R^d$, $R^1$, $R^2$, $R^3$, and $R^4$ are moieties satisfying the requirements previously described, but in this instance when L substituted further chosen from among those moieties, such as L' described above, which are capable of acting as flexible spacers allowing the precursor of the photocrosslinking moiety to orient itself spatially in relation to the remainder of the dipole monomer prior to polymerization.

In a preferred form form the photocrosslinking moiety L is derived from an activated vinyl group to satisfy Formula 25:

 (25)

where
Ac is an activating moiety and
$R^5$ is as previously defined.
In a specific preferred form the activating moiety is a carboxy —C(O)O— moiety.

In a specific preferred form of the invention the crosslinking moiety L satisfies Formula 26:

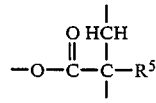 (26)

where
$R^5$ is as previously defined.

In a specifically preferred from of the invention the crosslinking moiety is an acrylate or methacrylate moiety.

The same exposure wavelength ranges and coinitiators can be employed as described above in connection with photocrosslinkable binders. Any of the photocrosslinkable monomers described above for locking monomeric molecular dipoles in polar alignment can be employed in combination with the photocrosslinkable molecular dipoles.

The use of forming optical transmission media of crosslinked molecular dipoles is that any proportion of the repeating units of the resulting polymeric matrix can include a molecular dipole. In fact, the molecular dipole repeating units preferably constitute at least 50, preferably at least 70 percent of the crosslinked polymeric matrix. All of the repeating units of the crosslinked polymeric matrix can be formed from molecular dipoles satisfying the requirements of the invention, if desired. As an alternative it is recognized that some repeating units can be present which differ from those described above solely in substituting for the sulfonyl electron acceptor moiety a conventional electron acceptor moiety.

In still another preferred form the molecular dipoles can take the form of polar aligned pendant groups in linear homo- and copolymers. Such embodiments are the specific subject matter of Robello et al, "An Optical Article Containing a Linear Polymer Exhibiting a High Level of Second Order Polarization Susceptibility", Ser. No. 101,884, concurrently filed and commonly assigned. As therein taught, from 5 to 100 percent of the repeating units of a vinyl addition polymer can contain repeating units containing a molecular dipole as a pendant group. In one preferred from the linear polymers are copolymers in which from 5 to 35 percent of the repeating units contain a molecular dipole as a pendant group while the remaining repeating units can be derived from any convenient vinyl addition polymer. For example, the remaining repeating units can take the form $$-\!\!+\!\!T_s\!\!+\!\!-$$

shown above in Formula 12. In another specifically contemplated form the copolymerized repeating units can satisfy Formula 13, but with the modification that z is 1. Other specifically contemplated forms of the copolymerized repeating units are esters and nitriles of 2-alkenoic acids, such as acrylic and methacrylic acid. Methyl and ethyl acrylates and methacrylates, acrylonitrile, and methacrylonitrile are specifically preferred examples of these repeating units.

In a preferred form the repeating units containing a molecular dipole satisfying the requirements of the invention can be represented by Formula 28:

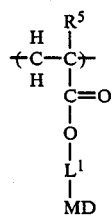

(28)

where
L¹ is a divalent flexible spacer moiety as previously described;
MD is any of the molecular dipole structure described above; and
R⁵ is hydrogen, halogen, or alkyl of from 1 to 6 carbon atoms, as previously described.

It is apparent that when $R^5$ is hydrogen or methyl the repeating unit is derived from an acrylate or methacrylate ester, respectively. These are the most common alkenoic acid esters employed in vinyl addition polymerization, but a variety of variants are known and can be employed alternatively, if desired. The acrylate and methacrylate esters are advantageous in offering the least molecular bulk.

In one preferred form molecular dipole MD along with the flexible spacer moiety $L^1$ can be represented by Formula Pair 27:

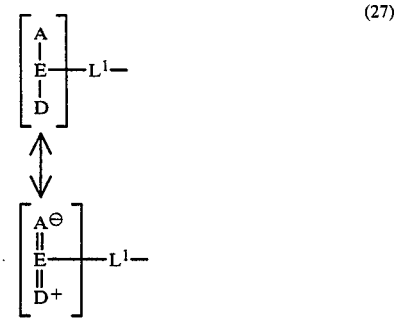

(27)

where
A is a sulfonyl electron acceptor moiety;
D is an amino electron donor moiety;
E is a linking moiety, specifically a conjugated π bonding system consisting of two terminal carbocyclic aromatic rings linked through 1 to 3 vinyl groups; and
$L^1$ is a flexible spacer moiety.

As in the case of forming a crosslinked repeating unit containing molecular dipole, linking sites to the molecular dipole can be provided through any of $R^1$, $R^2$, $R^3$, $R^a$, and $R^d$. Again, for the reasons set forth above, only with the sulfonyl electron acceptor moiety of the invention, is it possible to attach the molecular dipole through the electron acceptor moiety.

In a specifically contemplated form of the invention the repeating units containing molecular dipole pendant groups can satisfy Formula 29:

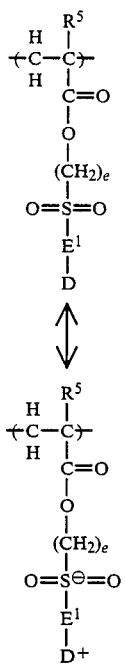

(29)

where
D is an electron donor moiety;
E is a 4,4'-stilbene linking moiety;
e is an integer of from 1 to 12; and
$R^5$ is as previously described.

When the optical transmission medium includes a linear polymer, whether including or separate from the molecular dipoles, the polymers preferably have molecular weights (weight average, also designated $M_w$) in the range of from about 10,000 to 200,000, optimally from about 15,000 to 120,000. Polymer molecular weights, unless otherwise indicated are understood to be measured by gel permeation chromotography (GPC) using differential refractive index differential and polystyrene standards. A molecular weight determination procedure of this type is described in detail in "Modern Size Exclusion Chromotography", W. W. Yau, J. J. Kirkland, and D. D. Bly, Wiley Interscience, J. Wiley and Sons, 1979.

The specific selection of materials forming the optically active transmission media will be influenced by the wavelengths of electromagnetic radiation the transmission be used to propagate. The preferred optical articles of this invention are those which exhibit the lowest possible absorptions of electromagnetic radiation in the optically active transmission medium. For optical articles which are intended to propagate a single wavelength or range of wavelengths of electromagnetic radiation, transmission media are employed which exhibit absorption minima within the wavelength region of propagation. Where the optical article itself receives electromagnetic radiation of one wavelength and internally produces for transmission electromagnetic radiation of a differing wavelength, the transmission medium is preferably chosen to exhibit minimal absorptions in both spectral regions. For example, if it is intended to employ an optical article according to this invention for second harmonic generation in response to infrared radiation received from a laser, such as a laser emitting in the 800 to 1600 nm region of the spectrum, the linear polymers are chosen to exhibit the lowest levels of absorption possible at the laser wavelength in the infrared and at the wavelength of the second harmonic in the visible spectrum.

EXAMPLES

The following are illustrative of specific embodiments of the invention:

EXAMPLE 1

4-Methylmercaptobenzyl chloride

To a stirred solution of 154 g (1 mol) of 4-methylmercaptobenzyl alcohol in 1 liter of dry benzene was added dropwise 80 mL 1.1 mol) of thionyl chloride. The mixture immediately turned blue. After the addition of the thionyl chloride was completed, the mixture was heated at reflux for 2 hours. After cooling the benzene and excess thionyl chloride were distilled at ambient pressure. The product was distilled in vacuo at 105° C. (0.5 mm), to yield 160 g (93%) of water clear liquid.

$^1$NMR (300 MHz, CDCl$_3$, δ) 2,49 (s, 3H), 4.57 (s, 2H), 7.28 (AB, Δυ=22 Hz, J=8.3 Hz, 4H).

EXAMPLE 2

Diethyl 4-Methylmercaptobenzylphosphonate

4-Methylmercaptobenzyl chloride (160 g, 0.94 mol) was added dropwise, under nitrogen, with stirring to 183 g (1.1 mole) of triethylphosphite which was heated at reflux. When the addition of the 4-methylmercaptobenzyl chloride was completed, the mixture was refluxed for additional 4 hours. The product was distilled in vacuo to yield 229 g (89%) of water clear, viscous liquid bp 142°–145° C. (0.025 mm).

$^1$H NMR (300 MHz, CDCl$_3$, δ): 1.27 (t, J=7.2 Hz, 6H), 2.49 (s, 3H), 3.13 (d, J=21.6 Hz, 2H), 4.04 (quintet, J=7.4 Hz, 4H), 7.66 (AB, Δυ=115.1 Hz, 4H).

EXAMPLE 3

Diethyl 4-Methylsulfonylbenzylphosphonate

To a stirred solution of 174 g (0.6 mole) of diethyl 4-methylmercaptobenzylphosphonate in 500 mL of glacial acetic acid was added dropwise 171 g (1.5 moles) of hydrogen peroxide (30% in water). The mixture was heated at reflux for 2 hours. After cooling, the water and acetic acid were removed under reduced pressure and the residue was distilled to yield 121 g (66%) of very viscous liquid bp 214°–216° C. (2×10$^{-4}$ mm).

$^1$H NMR (300 MHz, CDCl$_3$ δ): 1.23 (t, J=9.6 Hz, 6H), 3.01 (s), 3.19 (d, J=22,2 Hz, 2H), 4.02 (quintet, J=7.4 Hz, 4H), 7.66 (AB, Δυ=115.1 Hz, J=8.1, 4H).

EXAMPLE 4

4-Diallylaminobenzaldehyde

A mixture of 25.0 g (0.10 mol) of 4-fluorobenzaldeyde, 19.6 g (0.20 mol) of diallylamine, 21.3 g (0.20 mol) of sodium carbonate, 150 mL of hexamethylphosphoramide (HMPA), 0.20 g of hydroquinone, and 4 drops of tricaprylmethylammonium chloride was heated under nitrogen with stirring at 110° C. for 113 hr. The reaction mixture was cooled and poured into 1.5 L of water, and the resulting solution was extracted with toluene (4×300 mL). The combined extracts were washed with water (3×250 mL), dried (MgSO$_4$), and the solvent was removed at reduced pressure. The brown residue was fractionally distilled in vacuo to provide 22.3 g (55%) of a pale yellow oil, bp 128°–142° C. (0.16 mm).

IR (neat liquid film) cm$^{-1}$ 3085, 3015, 2987, 2735, 2816, 1675, 1595, 1557, 1525, 1395, 1353, 1312, 1231, 1162, 989, 922, 813, 747, 639, 619, 553, 511.

$^1$H NMR (300 MHz, CDCl$_3$) δ 3.99 (m, 4H), 5.18 (m, 4H), 5.80 (m, 2H), 6.70 (d, 2H), 7.70 (d, 2H), 9.71 (s, 1H).

EXAMPLE 5

4′-Diallylamino-4-methylsulfonylstilbene

To a suspension of 3.4 g (0.0845 mol) of 60% sodium hydride dispersion, 13.5 g (0.675 mol) of N,N-diallylaminobenzaldehyde and 200 mL of dry, freshly distilled 1,2-dimethoxyethane (DME) was added, under nitrogen, with vigorous stirring a solution of 20.6 g (0.675 mole) of diethyl 4-methylsulfonylbenzylphosphonate in 50 mL DME. The mixture immediately turned bright yellow. The reaction mixture was heated at reflux of two hours. After cooling the bright yellow solution was poured over 250 g of crushed ice under a nitrogen blanket. The bright yellow solid was collected by filtration, washed with cold water, and air dried. Recrystallization from methanol to yields 18.2 g (78%) of bright yellow crystals mp 101°–102° C.

$^1$H NMR (300 MHz, CDCl$_3$, δ): 3.07 (s, 3H), 3.99 (d, broad, J=4.5 Hz, 4H), 5.18 (d, J=3.6 Hz, 2H) 5.23 (s, 2H, 5.89 (m, 1H), 7.07 (AB, Δυ=210.8 Hz, J=8.7 Hz, 4H), 7.05 (AB, Δυ=82.7 Hz, J.=16.2 Hz, 2H), 7.76 (AB, Δυ=78.3 Hz, J=8.3 Hz, 4H).

EXAMPLE 6

4-Dimethylamino-4′-methylsulfonylstilbene

To a solution of 2.8 g (0.07 mol) of 60% sodium hydride dispersion, 7.46 g (0.05 mole) N,N-dimethylaminobenzaldehyde, and 100 mL of dry, freshly distilled 1,2-dimethoxyethane (DME) under nitrogen, at room temperature, was added 15.3 g (0.05 mole) diethyl 4-methylsulfonylbenzylphosphonate with vigorous stirring. The mixture immediately turned bright yellow. The mixture was heated at reflux for 2 hours. After cooling the very bright yellow solution was poured over 300 g of crushed ice under nitrogen blanket. The bright yellow solid was collected by filtration, washed with water, and air dried. Recrystallization from a 1:1 mixture of absolute ethanol and dry pyridine yielded 9.97 g (66%) of bright yellow crystals mp 242°–243° C.

$^1$H NMR (300 MHz, CDCl$_3$, δ): 3.01 (s, 6H), 3.06 (s, 3H), 7.08 (AB, Δυ=216.8 Hz, J=8.6 Hz, 4H), 7.05 (AB, Δυ=82.5 Hz, J×16.2 Hz, 2H), 7.74 (AB, Δυ=76.6 Hz, J=8.2 Hz, 4H).

EXAMPLE 7

N-(6-Hydroxyhexyl)-N-methylaniline

A mixture of 153 g (1.43 mol) of freshly distilled N-methylaniline, 200 g (1.46 mol) 6-chlorohexanol, 200 g (1.45 mol) potassium carbonate, 6 g potassium iodide, and 750 mL n-butanol was heated at reflux under nitrogen with vigorous mechanical stirring for 4 days. The solution was cooled, filtered, and the solvent was removed at reduced pressure. The residue was distilled in vacuo to produce 210 g (71%) of a colorless oil, bp 153°–166° C. (0.10 mm).

$^1$H NMR (300 MHz, CDCl$_3$) δ 1.44 (m, 4H), 1.62 (m, 5H), 2.98 (s, 3H, 3.36 (t, 2H), 3.67 (t, 2H), 6.74 (m, 3H), 7.29 (t, 2H).

EXAMPLE 8

N-(6-Acetoxyhexyl)-N-methylaniline

A mixture of 210 g (1.01 mol) of N-(6-hydroxyhexyl)-N-methylaniline, 112 g (1.10 mol) of acetic anhydride, and 86 g (1.1 mol) of pyridine was heated at reflux with stirring for 2 hours. After cooling, the solution was poured onto 500 g of ice and extracted with ethyl acetate (4×300 mL). The combined extracts were dried (MgSO$_4$) and the solvent was removed at reduced pressure. The residue was distilled in vacuo, collecting the fraction boiling at 130° C. (0.01 mm). Yield: 231 g (93%) of a colorless oil.

$^1$H NMR (300 MHz, CDCl$_3$) δ 1.40 (m, 4H), 1.65 (m, 4H), 2.08 (2, 3H), 2.96 (s, 3H), 3.37 (t, 2H) 4.07 (t, 2H), 6.75 (m, 3H), 7.23 (t, 2H).

EXAMPLE 9

4-[(6-acetoxyhexyl)methylamino]benzaldehyde

Phosphorous oxychloride (145 g, 0.95 mol) was added dropwise at 5° C. to 280 mL of stirred N,N-dimethylformamide (DMF), and the mixture was stirred at 5° C. for 2 hours. N-(6-Acetoxyhexyl)-N-methylaniline (230 g, 0.93 mol) was added slowly, and the reaction mixture was heated at 90° C. for 3 hours. After cooling, the solution was poured onto 500 g of ice and the resulting mixture was neutralized to pH 5 with sodium acetate. The mixture was extracted with dichloromethane (4×200 mL), the combined extracts were dried (MgSO$_4$), and the solvent was removed at reduced pressure. The brown residue was distilled in vacuo the provide 186 g (73%) of a yellow oil, bp 195° C. (0.15 mm).

H NMR (300 MHz, CDCl$_3$) δ 1.38 (m, 4H), 1.60 (m, 4H), 2.02 (s, 3H), 2.98 (s, 3H), 3.37 (t, 2H), 4.02 (t, 2H), 6.65 (d, 2H), 7.66 (d, 2H), 9.74 (s, 1H).

EXAMPLE 10

4′-[N-methyl-N-(6-hydroxyhexyl)amino]-4-methylsufonylstilbene

To a solution of 5 g (0.125 mol) 60% sodium hydride dispersion, 27.7 g (0.1 mole) of N-methyl-N-(6-acetoxyhexyl)aminobenzaldehyde and 200 mL of dry, freshly distilled 1,2-dimethoxyethane (DME) under nitrogen, at room temperature, with vigorous stirring was added 30.6 g (0.1 mole) of diethyl 4-methylsulfonylbenzylphosphonate. The mixture immediately turned yellow. The reaction mixture was heated at reflux for 2 hours. The bright yellow solution was poured over 400 g of crushed ice under a nitrogen blanket and the resulting mixture was extracted with four 250 mL portions of dichloromethane. The combined organic extracts were washed three times with 250 mL of water, and the solvent was removed at reduced pressure. The residue was dissolved in 250 mL of 10% (v/v) HCl in 1:1 ethanol:water and the solution was heated at refluxed for 4 hours. After cooling the solution was neutralized to pH 7 by the slow and careful addition of sodium carbonate. The yellow solid thus formed was collected by filtration, washed with water and air dried. Recrystallization from methanol yields 31.4 g of bright yellow solid (81%). This material contained some acetate which was not hydrolyzed (≈5%). A pure sample of the material was obtained by chromatography. Thus, 5 g of the material was dissolved in 25 mL of a mixture of acetone-:ethylacetate 1:5, and loaded onto a dry silica gel column (500 g) gave 4.5 g of pure material which was then crystallized from absolute methanol mp 113°-115° C.

$^1$H NMR (300 MHz, CDCl$_3$, δ): 1.45 (m, 4H), 1.63 (m, 4H), 3.01 (s, 3H), 3.09 (s, 3H), 3.39 (t, J=7.6 Hz, 2H), 3.69 (t, broad, 2H), 7.07 (AB, Δυ=224 Hz, J=8.7 Hz, 4H), 7.1 (AB, Δυ=85.5 Hz, J=16.2 Hz, 2H), 7.77 (AB, Δυ=77.3 Hz, J=8.3 Hz, 4H).

EXAMPLE 11

4'-[(6-acryloyloxyhexyl)methylamino]-4-methylsulfonylstilbene

A mixture of 4'-[(6-hydroxyhexyl)methylamino]-4-methylsulfonylstilbene (5.00 g, 12.9 mmol) was treated with triethylamine (1.63 g, 16.2 mmol) and acryloyl chloride (1.46 g, 16.2 mmol) as above. The product was purified by chromatography on silica gel (CH$_2$CL$_2$ eluent) and recrystallization from acetone/hexanes to yield 2.10 g (37%) of a yellow solid, mp 88°-90° C.

$^1$H NMR (300 MHz, CDCl$_3$) δ 1.40 (m, 4H), 1.70 (m, 4H), 3.00 (s, 3H), 3.06 (s, 3H), 3.37 (t, 2H), 4.17 (t, 2H), 5.82 (dd, 1H), 6.12 (m, 1H), 6.40 (dd, 1H), 6.70 (d, 2H), 6.91 (d, 1H), 7.09 (d, 1H), 7.44 (d, 1HO, 7.62 (d, 2H), 7.88 (d, 2HO. $^{13}$C[$^1$H] NMR (75.5 MHz, CDCl$_3$) δ 25.8, 26.7, 28.6, 44.6, 64.4, 121.4, 126.3, 127.2, 127.7, 128.3, 128.6, 129.5, 130.2, 130.4, 148.4.

EXAMPLE 12

N,N-Di(6-hydroxyhexyl)aniline

A mixture of freshly distilled aniline (93 g, 1.10 mol), potassium carbonate (304 g, 2.2 mol), 6-chloro-1-hexanol (300.0 g, 2.2 mol), and 500 mL of η-butanol was heated at reflux for 82 hours under nitrogen with vigorous stirring. After cooling and filtering, the butanol was evaporated at reduced pressure to leave a tan oil. The oil was fractionally distilled in vacuo, yielding 205 g (70%) of the title compound as a colorless oil, bp 195°-225° C. (0.15 nm).

$^1$H NMR (300 MHz, CDCl$_3$ δ 1.35 (m, 8H), 1.54 (m, 8H), 2.75 (brs, 2H), 3.22 (t, 4H), 3.56 (t, 4H), 6.61 (m, 3H), 7.18 (t, 2H).

EXAMPLE 13

N,N-Di-(6-acetoxyhexyl)aniline

To a stirred solution of N,N-di-(6-hydroxyhexyl)aniline (205 g, 0.70 mol) and pyridine (133 g, 1.7 mol) was added acetic anhydride (171 g, 1.7 mol) dropwise at room temperature. After the initial exothermic reaction has subsided, the stirred solution was heated at reflux for 4 hours. After cooling, the solution was poured onto 500 g of ice and the resulting mixture was extracted with four 250 mL portions of dichloromethane. The combined organic extracts were washed three times with 250 mL of water, and dried over anhydrous sodium sulfate. The solvent was removed at reduced pressure and the resulting brown oil was fractionally distilled in vacuo to produce 236 g (90%) of the title compound as a slightly yellow oil, bp 220°-230° C. (0.15 mm).

$^1$H NMR (300 MHz, CDCl$_3$ δ 1.25 (m, 8H), 1.47 (m, 8H), 1.86 (s, 6H), 3.12 (t, 4H), 3.89 (t, 4H), 6.46 (m, 3H), 7.03 (t, 2H).

EXAMPLE 14

4-[Di-(6-acetoxyhexyl)amino]benzaldehyde

N,N-Dimethylformamide (DMF, 250 mL) was added dropwise with stirring under nitrogen to phosphorous oxychloride at 0° C. The resulting orange solution was stirred for 2 hours, then a solution of 236 g (0163 mol) of N,N-di-(6-acetoxyhexyl)aniline in 250 mL of DMF was added slowly. The reaction mixture was stirred under nitrogen for 1 hour at 0° C. and then for 6 hours at 80° C. After cooling, the solution was poured onto 500 g of ice plus 200 g of sodium acetate, and the resulting mixture was extracted with dichloromethane (4×250 mL). The combined organic extracts were washed four times with 250 mL portions of water, dried over anhydrous sodium sulfate, and then concentrated at reduced pressure to produce a light brown oil. The oil was fractionally distilled in vacuo to yield 192 g (76%) of the title compound as a gold oil, bp 220°-260° C. (0.007 mm).

$^1$H NMR (300 MHz, CDCl$_3$ δ 1.39 (m, 8H), 1.63 (m, 8H), 2.04 (s, 6H), 3.35 (t, 4H), 4.07 (t, 4H), 6.64 (4, 2H), 7.70 (d, 2H), 9.70 (s, 1H).

EXAMPLE 15

4-N,N-Di(6-hydroxyhexyl)amino-4'-methylsulfonylstilbene

To a solution of 5 g (0.125 mol) 60% sodium hydride dispersion, 37.7 g (0.1 mole) of N,N-Di(6-acetoxyhexyl)aminobenzaldehyde and 200 mL of dry, freshly distilled 1,2-dimethoxy ethane (DME) under nitrogen, at room temperature, with vigorous stirring was added 30.6 g (0.1 mole) of diethyl 4-methylsulfonylbenzylphosphonate. The mixture immediately turned yellow. The reaction mixture was heated at reflux for 2 hours. The bright yellow solution was poured over 400 g of crushed ice under a nitrogen blanket and the resulting mixture was extracted with four 250 mL portions of dichloromethane. The combined organic extracts were washed three times with 250 mL of water, and the solvent was removed at reduced pressure. The residue ws dissolved in 500 mL of 10% (v/v) HCl in 1:1 ethanol:water and the solution was heated at refluxed for 4 hours. After cooling the solution was neutralized to pH 7 by the slow and careful addition of sodium carbonate. The mixture was extracted with four 250 mL portions of dichloromethane. The combined organic extracts were washed three times with 250 mL of water, dried over magnesium sulfate, and the solvent was removed under reduced pressure. The dark yellow residue was chromatographed on dry silica gel (a ratio of 1:50 of residue:silica gel was used) with 1:4 acetone:dichloromethane as the eluent. The bright yellow fractions were collected and the solvents were removed under reduced pressure yielding 29.4 g (62.1%) of very viscous oil which solidified after about a week to a semi-solid material.

$^1$MNR (300 HHz, CDCl$_3$, δ): 1.41 (m, 8H), 1.61 (m, 8H), 3.06 (s, 3H), 3.31 (t, J=7.6 Hz, 4H), 3.66 (t, J=6.4 Hz, 4H), 6.93 (AB, Δυ=88 Hz, J=16.2 Hz, 2H), 7.01 (AB, Δυ=232 Hz, J=8.7 Hz, 4H), 7.73 (AB, Δυ=77.6 Hz, J=8.2 Hz, 4H).

EXAMPLE 16

4'-(Di-6-methacryloyloxyhexyl)amino-4-methylsulfonylstilbene

4'-Di-(6-hydroxyhexyl)amino-4-methylsulfonylstilbene (10.0 g, 21.1 mmol) was reacted with freshly distilled methacryloyl chloride and triethylamine. The product was purified by column chromatography on silica gel using dichloromethane as eluent. A yellow oil was obtained, but the yield could not be determined because the compound tended to polymerize spontaneously when all the solvent was removed.

$^1$H NMR (300 MHz, CDCl$_3$ δ 1.21 (m, 8H), 1/65 (m, 8H), 1.98 (s, 6H), 3.09 (s, 3H), 3.34 (t, 4H), 4.16 (t, 4H), 5.55 (s, 2H), 6.10 (s, 2H), 6.62 (d, 2H), 6.90 (d, 1H), 7.09 (d, 1H), 7.40 (d, 2H), 7.61 (d, 2H), 7.89 (d, 2H).

EXAMPLE 17

N-Methyl-N-2-[2-(hydroxyethoxy)ethoxy]ethylaniline

A mixture of freshly distilled N-methylaniline (116 g, 1.1 mol), potassium carbonate (175 g, 1.25 mol), sodium iodide (4 g, 0.025 mol), 2-[2-(2-chloroethoxy)ethoxy]ethanol (168 g, 1 mol), and 900 mL of butanol was heated at reflux for 72 hours under nitrogen with vigorous stirring. After cooling and filtration the butanol was evaporated at reduced pressure to leave a tan oil. The oil was fractionally distilled in vacuo, yielding 150 g (63%) as a colorless oil, bp 190°–191° C. (0.13 mm).

$^1$H NMR (300 MHz, CDCl$_3$, δ): 2.99 (s, 3H), 3.64 (m, 12H), 6.73 (m, 3H), 7.24 (m, 2H).

EXAMRLE 18

N-Methyl-N-2-{2-[2-(4-nitrobenzolyloxy)ethoxy]ethoxy}ethylaniline

To a stirred solution of N-methyl-N-2-[2-hydroxyethoxy]-ethoxy)-ethylaniline (148.5 g 0.621 mol), triethylamine (65.9 g, 0.652 mol), and dry dichloromethane (250 mL) under nitrogen at 0° C. was added a slurry of p-nitrobenzoly chloride (120.9 g, 0.652 mol) and 350 mL of dichloromethane. The mixture was stirred under nitrogen for 2 hours at 0° C. and then for 24 hours at 25° C. The mixture was filtered and the filtrate was washed successively with saturated sodium bicarbonate (2×100 mL) and water (2×100 mL). The solution was dried (MgSO$_4$) and the solvent was removed at reduced pressure to leave a red oil.

$^1$NMR (300 MHz, CDCl$_3$) δ 2.98 (s, 3H), 3.55 (t, 2H), 3.64 (m, 6H), 3.83 (t, 2H), 4.56 (t, 2H), 6.71 (m, 3H), 7.20 (t, 2H), 8.24 (dd, 4H).

EXAMPLE 19

2-[2-N-methyl-N-(4-formylphenyl)aminoethoxy]ethoxyethyl 4-nitrobenzoate

Phosphorus oxychloride (100 g, 0.66 mol) was added dropwise with stirring, at 5° C., under nitrogen to 180 mL of N,N-dimethylformamide (DMF). The resulting orange solution was stirred for 2 hours, then 231 g (0.59 mol) of 2-(2-N-methyl-N-phenylaminoethoxyl)ethoxyethyl 4-nitrobenzoate was added slowly. The reaction mixture was stirred at 5° C. for 1 hour and then for 4 hours at 90° C. After cooling the solution was poured onto 1 Kg of crushed ice and neutralized to pH 6 by a slow addition of sodium acetate, with vigorous stirring. The resulting mixture was extracted with four 250 mL portions of dichloromethane. The combined organic extracts were washed three times with 250 mL of water, dried over magnesium sulfate, and then concentrated at reduced pressure to produce a brown oil. This oil was chromatographed on silica gel (a ratio of 1:50 oil:silica was used) with 1:1 acetone:dichloromethane. The resulting solution was concentrated under reduced pressure and the residual solvent was removed in vacuo at room temperature, over night. The yield was 161 g (62%) of light brown oil.

$^1$H NMR (300 MHz, CDCl$_3$, δ): 3.09 (s, 3H), 3.65 (m, 8H), 3.84 (t, J=4.7 Hz, 2H), 4.51 (t, J=4.7 Hz, 2H), 7.21 (AB, Δυ=297 Hz, J=8.8 Hz, 4H), 8.25 (AB, Δυ=18.5 Hz, J=9.0 Hz, 4H), 9.72 (s, 1H).

EXAMPLE 20

4-Tolyl octadecyl sulfide

Sodium (44 g, 1.92 mol) was added in small portions to 1.5 liter of absolute ethanol containing 217 g (1.75 mol) of thiocresol, with stirring, uinder nitrogen. After the addition was completed, 640 g (1.92 mol) of bromooctadecane was added, and the mixture was heated at reflux for 2 hours. The hot reaction mixture was filtered, and the ethanol was removed under reduced pressure. The residue was crystallized from heptane yielding 595 g (91%) of white crystals. mp 54°–55° C.

$^1$H NMR (300 MHz. CDCl$_3$, δ): 0.94 (t, J=9.6 Hz, 3H), 1.32 (s, 28H), 1.46 (m, 2H), 1.67 (quintet, J=7.2 Hz, 2H), 2.37 (s, 3HO, 2.92 (t, J=7.3, 2H), 7.22 (AB, Δυ=47.2 Hz, J=8.1 Hz, 4H).

EXAMPLE 21

4-Tolyl octadecyl sulfone

To a stirred solution of 4-tolyl octadecyl sulfide (564 g 1.5 mol) in 1.5 liter of glacial acetic acid, was added in 50 mL portions, during 30 min., 30% hydrogen peroxide (425 g, 3.75 mol), with stirring. After the addition was completed the reaction mixture was heated at reflux for 3 hours. The hot solution was poured over 1 Kg of crushed ice and the resulting solid was filtered, washed well with water, and air dried. Crystallization from heptane yielded 412 g (63%) of white crystals. mp 79°–80° C.

$^1$H NMR (300 MHz, CDCl$_3$, δ): 0.86 (t, J=6.9 Hz, 3H), 1.21 (s), and 1.24 (s) (together 30H), 1.67 (m, 2H), 2.43 (s, 3H), 3.03 (t, broad, J=8.0 Hz, 2H), 7.55 (AB, Δυ=128.3 Hz, J=8.1 Hz, 4H).

EXAMPLE 22

4-Octadecylsulfonylbenzyl bromide

To a stirred solution, at reflux, of 22 g (0.054 mol) of 4-tolyl octadecyl sulfide in 150 mL of dry carbon tetrachloride, was added, in 2 g portions, every 10 min., a mixture of 17.8 g (0.1 mol) of N-bromosuccinimide and 0.2 g (8.34×10$^{-4}$ mol) benzoyl peroxide. After the addition was completed the reaction mixture was refluxed for additional 2 hours. After cooling the reaction mixture was filtered and the solvent was removed under reduced pressure. The residue (30.5 g) contained about 65% of the desired product by $^1$H NMR. This mixture was used for the next reaction without further purification.

EXAMPLE 23

Diethyl 4-octadecylsulfonylbenzyl phosphonate

To 32.2 g (0.2 mol) of triethyl phosphite was added 30.5 g of the bromination mixture. The reaction mixture was heated at reflux for 2 hours. The hot solution was mixed carefully with 200 mL of heptane, and the solution was kept in the freezer for two hours. The solid was collected by filtration and was purified by chromatography on dry silica gel (500 g) with 30% acetone in dichloromethane as the eluent. Crystallization of the pure product from heptane yielded 9.98 g (52% based on calculated bromine). mp 65°–66° C.

$^1$H NMR (300 MHz, CDCl$_3$, δ): 0.89 (t, J=6.9 Hz, 3H), 1.25 (s), 1.26 (s), 1.27 (s), and 129 (s), (together 36H), 1.34 (m, 2H), 3.07 (, broad, J=7.9 Hz, 2H), 3.24

(d, J=22 Hz, 2H), 4.06 (quintet, J=7.6 Hz, 4H), 7.69 (AB, Δυ=104 Hz, J=8.1 Hz, the upfield doublet is further coupled by the phosphorous and appears as dd, J=2.2 Hz).

EXAMPLE 24

4-N-methyl-N-[2-(2-hydroxyethoxy)ethoxy]e-thylamino-4-octadecylsulfonylstilbene

To a solution of 2 g (0.05 mol) of 60% sodium hydride dispersion, 9.73 g (0.025 mol) N-methyl-N-[2-(2-hydroxyetholyl)ethoxy]ethylaminobenzaldehyde, and 200 mL of dry, freshly distilled 1,2-dimethoxtethane (DME) under nitrogen, at room temperature, was added 13.5 g (0.025 mol) of diethyl 4-octadecylsulfonyl-benzyl-phosphonate with vigorous stirring. The reaction mixture was heated at reflux for 2 hours. After cooling the light brown suspension was poured onto 300 g of crushed ice under a nitrogen blanket. The mixture was extracted with three 200 mL portions of methylene chloride. The combined organic extracts were washed three times with 200 mL of water, and the solvent was removed at reduced pressure. The residue was dissolved in 200 mL of 10% HCl in 1:1 ethanol:water and heated at reflux for 2 hours. After cooling the mixture was neutralized to pH 7 with concentrated ammonia solution. The resulting mixture was extracted with three portions of 200 mL of methylene chloride. The combined organic extracts were washed three times with 100 mL water, dried over sodium sulfate, and the solvent was removed under reduced pressure. The residue was chromatographed on 500 g of dry silica gel with 1:4 acetone:dichloromethane mixture as the eluent. The resulting bright yellow solution was concentrated under reduced pressure and the residue was recrystallized from absolute methanol yielding 3.5 g (21%) of bright yellow solid, mp 82°–83° C.

$^1$H NMR (300 MHz, CDCl$_3$, δ): 0.91 (t, J=6.98 Hz, 3H), 1.26 (s) and 1.28 (s) together 30H, 1.74 (m, 2H), 2.27 (broad, 1H), 3.08 (s, 3H), 3.11 (t, broad, J=8.0 Hz, 2H), 3.70 (m, 12H), 7.10 (AB, Δυ=211.9 Hz, J=8.8 Hz, 4H), 7.08 (AB, Δυ=81.7 Hz, J=16.2 Hz, 2H), 7.75 (AB, Δυ=65.8 Hz, J=8.3 Hz, 4H).

EXAMPLE 25

Butyl 6-(N-methyl-N-phenylamino)hexanoate

A mixture of freshly distilled N-methylaniline (10.7 g, 0.1 mol), potassium carbonate (21 g, 0.15 mol), butyl 6-bromohexanoate (31.5 g, 0.125 mol), sodium iodide (0.75 g, 0.005 mol), and 100 mL of butanol was heated at reflux for 72 hours under nitrogen with vigorous stirring. After cooling the solution was filtered and the filtrate was evaporated under reduced pressure. The residue was distilled (in vacuo) yielding 23.5 (85%) of colorless oil bp 159°–160° C. (0.004 mm).

$^1$H NMR (300 MHz, CDCl$_3$, δ): 0.99 (t, J=7.3 Hz, 3H), 1.42 (m, 4H), 1.66 (m, 6H), 2.36 (t, J=7.5, 2H), 2.96 (, 3H), 3.35 (t, J=7.5, 2H), 4.12 (t, J=6.7, 2H), 6.72 (m, 3H), 7.27 (m, 2H).

EXAMPLE 26

Butyl 6-[N-methyl-N-(4-formylphenyl)amino]hexanoate

Phosphorus oxychloride (18.4 g, 0.12 mol) was added dropwise with stirring, at 5° C., under nitrogen, to N,N-dimethylformamide (DMF, 50 mL). The resulting orange solution was stirred for 2 hours, then 27.6 g (0.81 mol) of butyl 6-(N-methyl-N-phenylamino)hexanoate was dropwise. The reaction mixture was stirred at 5° C. for 1 hour and then was heated in a water bath to 90° C., for 4 hours. After cooling the hot solution was poured over 200 g of crushed ice and naturalized to pH 6 by a slow addition of solid sodium acetate with vigorous stirring. The mixture was extracted with three portions of 200 mL dichloromethane. The combined organic extracts were washed three times with water, dried over magnesium sulfate, and the solvent was removed under reduced pressure. The residue was distilled in vacuo yielding 23.4 g (76.8%) of pale yellow oil bp 151°–153° C. (3×10$^{-4}$ mm).

$^1$H NMR (300 MHz, CDCl$_3$, δ): 0.93 (t, J=7.3 Hz, 3H), 1.38 (m, 4H), 1.63 (m, 6H), 3.04 (s, 3H), 3.41 (t, J=7.6 Hz, 2H), 4.07 (t, J=6.0 Hz, 2H), 7.2 (AB, Δυ=315.1 Hz, J=7.2, 4H, 9.72 (s, 1H).

EXAMPLE 27

4-N-methyl-N-(5-carboxylpentyl)amino-4-octadecylsulfonylstilbene

To a solution of 0.6 g (0.15 mol) of 60% sodium hydride dispersion, 3.0 g (0.012 mol) of butyl 6-[N-methyl-N-(4-formylphenyl)amino]hexanoate and 45 mL of dry, freshly distilled 1,2-dimethoxtethane (DME) under nitrogen, at room temperature, was added 5.4 g (0.01 mol) of diethyl 4-octadecylsulfonylbenzylphosphonate with vigorous stirring. The reaction mixture was heated at reflux for 2 hours. After cooling the light brown suspension was poured onto 100 g of crushed ice under a nitrogen blanket. The solid thus formed was filtered, washed with water, and air dried. Recrystallization from 2:3 butanone:isopropanol gave 4.7 g (70%) of light yellow solid.

To a to mL of 10% hydrochloric acid solution in 1:1 ethanol:water was added 2.5 g of the above ester. The mixture was heated at reflux over night with magnetic stirring. The hot solution was poured over 50 g of crushed ice and the mixture was neutralized with sodium bicarbonate to pH 4. The solid thus formed was collected by filtration, washed with water, and air dried. Chromatography og 500 mG of the solid on 50 g of dry silica gel, with 1:4 acetone:ethyl acetate gave 250 mG of the product. Recrystallization from methanol gave pale yellow powder mp 120°–121° C.

$^1$H NMR (300 MHz, CDCl$_3$, δ): 0.89 (t, J=6.9 Hz, 3H), 1.24 (s), 1.26 (s) and 1.37 (m), (together 32H), 1.69 (m, 6H), 2.39 (t, J=7.4 Hz, 2H), 2.99 (s, 3H), 3.09 (t, broad, J=6.0 Hz, 2H), 3.37 (t, J=7.5 Hz, 2H), 7.06 (AB, Δυ=224 Hz, J=8.9 Hz, 4H), 7.05 (AB, Δυ=84 Hz, J=16.2 Hz, 2H), 7.71 (AB, Δυ=66 Hz, J=8.4 Hz, 4H).

EXAMPLE 28

N,N-dioctadecylaniline

A mixture of freshly distilled aniline (93 g, 1 mol), potassium carbonate (210 g, 1.5 mol), octadecyl bromide (840 g, 2.5 mol), sodium iodide (7.5 g, 0.05 mol), and 1 liter of butanol was heated at reflux for 72 hours under nitrogen with vigorous stirring. The hot solution was filtered and the filtrate was evaporated under reduced pressure. The residue was recrystallized from absolute ethanol to yield 322 g (54%) of off-white crystals mp 110°–111° C.

$^1$H NMR (300 MHz, CDCl$_3$, δ): 0.89 (t, J=4.9 Hz, 6H), 1.20 (s) and 1.26 (s) together 60H, 2.07 (s, broad, 4H), 3.25 (t, J=8.8 Hz, 4H).

EXAMPLE 29

N,N-dioctadecylaminobenzaldehyde

Phosphorus oxychloride (15.3 g, 0.1 mole) was added dropwise with stirring, at 5° C., under nitrogen, to N,N-dimethylformamide (DMF, 50 mL). The resulting orange solution was stirred for 2 hours, then 42 g (0.08 mole) of N,N-dioctadecylaniline was added all at once. The reaction mixture was heated in a water bath to 90° C., and stirring was continued for 4 hours. The hot solution was poured over 200 g of crushed ice and naturalized to pH 6 by a slow addition of solid sodium acetate with vigorous stirring. The greenish-tint crystalline precipitate was filtered by suction, washed with water on the filter and air dried. The light green product was recrystallized from isopropanol to yield 46.5 g (93%) of pale-green crystals mp 65°–66° C.

$^1$H NMR (300 MHz, CDCl$_3$, δ): 0.87 (t, J=6.2 Hz, 6H), 1.25 (s, 60H), 1.60 (s, broad, 4H), 3.33 (t, J=6, 4H), 7.16 (AB, Δυ=319 Hz, J=7.9 Hz, 4H), 9.69 (, 1H).

EXAMPLE 30

4-Dioctadecylamino-4'-methylsulfonylstilbene

To a solution of 420 mG of 60% sodium hydride dispersion (0.011 mol), 6.26 g (0.01 mol) of N,N-dioctadecylaminobenzaldehyde and 40 mL of dry, freshly distilled 1,2-dimethoxyethane (DME) under nitrogen, at room temperature, with vigorous stirring, was added a solution of 3.06 g (0.01 mol) of diethyl 4-methylsulfonylbenzylphosphonate in 10 mL 1,2-dimethoxyethane. The mixture immediately turned bright yellow. The reaction mixture was heated at reflux for 2 hours. After cooling, the bright yellow solution was poured over 100 g of crushed ice under a nitrogen blanket. The bright yellow solid was collected by filtration, washed with cold water, and air dried. Recrystallization from ethanol yielded 3.95 g (50.7%) of bright yellow powder mp 75°–76° C.

$^1$H NMR (300 MHz, CDCl$_3$, δ): 0.84 (t, J=6.0 Hz, 6H), 1.25 (s) and 1.31 (s) (together 60H) 1.58 (t, broad, J=9.3, 4H), 3.04 (s, 3H), 3.27 (t, J=7.4 Hz, 4H), 6.99 (AB, Δυ=232 Hz, J=8.9 Hz, 4H), 7.01 (AB, Δυ=89.4 Hz, J=16.2 Hz, 2H, 7.72 (AB, Δυ=78 Hz, J=8.4 Hz, 4H).

EXAMPLE 31

Second Harmonic Generation by Crystalline Powder 4-Diallylamino-4'-methylsulfonylstilbene A polycrystalline sample of 4-diallylamino-4'-methylsulfonylstilbene prepared according to Example 5 was illuminated with 1064 nm laser. A visually discernable amount of light was produced, indicating second harmonic geneation of light at 532 nm. This indicated that the crystal structure for this material is noncentrosymmetric and that crystalline forms of the this material can be used in optical articles intended to exhibit second order polarization effects.

Visual comparisons were made of the 4-diallylamino-4'-methylsulfonylstilbene microcrystalline sample with a similarly powdered sample of 2-methyl-4-nitroaniline, a crystal known to have large values of x$^{(2)}$. The visable light produced by the sample of this example was more intense, indicating that the x$^{(2)}$ was greater than 1.8×10$^{-7}$ esu, the known x$^{(2)}$ value of the control sample.

EXAMPLE 32

Poled Film Prepared from 4'-(Di-6-methacryloyloxyhexyl)amino-4-methylsulfonylstilbene A composition was prepared for spin casting of the following formula:
- 0.45 gm Title compound
- 0.010 gm Photosensitizer (A1)
- 0.070 gm Activator (A2)
- 2 ml Dichloromethane where A2 was 1-methoxy-4-pyridinium tetrafluoroborate and A1 was

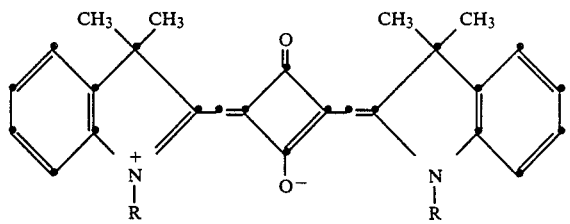

R=phenyl.

The solution was spin cast at 250 rpm onto 250 μm gap side-by-side chromium electrodes on a clear plastic support by first thoroughly wetting the support and electrode surfaces with the solution before spinning. An electric field of 8×10$^4$ V/cm was placed across the film and held for 4 hours while crosslinking occurred as the result of exposure to room light, since the photosensitizer exhibited a peak absorption at 532 nm.

EXAMPLE 33

Formation of a Poled Transmission Medium Using 4'-Diallylamino-4-methylsulfonylstilbene The molecular dipole 4'-diallylamino-4-methylsulfonylstilbene was dissolved in the monomeric binder precursor tris(2-acryloylethyl)-1,3,5-benzene tricarboxylate in the concentration of 9.5 percent by weight, based on the weight of the binder precursor. The coinitiator pair A1 and A2 were employed. One ml of dichloromethane was added to insure complete dissolution of the ingredients, and the resulting solution was stirred for 2 hours. The solution was concentrated until most of the dichloromethane had been removed.

Using a syringe the solution was placed between transparent indium tin oxide (ITO) electrodes deposited on optical flat quartz substrates separated by a 25 μm poly(ethylene terephthalate) spacer. When the gap between the electrodes was filled, a DC voltage of 3.7×10$^5$ V/cm was applied across the electrodes to pole the molecular dipoles. The poled solution was exposed for 45 minutes with a 200 watt mercury vapor lamp to near UV radiation to create an optical article containing an optically active transmission medium comprised of polar aligned molecular dipoles and a crosslinked polymeric binder. Upon removal of the externally applied electric field, the molecular dipoles remained in polar alignment. The transmission medium produced appeared on visual inspection to be transparent and colorless.

The polar alignment of the molecular dipoles before, during, and after photocrosslinking was probed by supplying infrared radiation from a laser at 1064 nm and observing visible light produced as a second harmonic at 532 nm. The unpoled material prior to crosslinking exhibited no second harmonic of the laser beam. Poling of the uncrosslinked material produced a second harmonic, but no second harmonic was in evidence when poling of the uncrosslinked solution was discontinued. Following poling and crosslinking a second harmonic was generated equal in intensity to that observed when the uncrosslinked solution was poled. Laser examination after an extended period of months revealed no reduction in second harmonic generation.

When the same composition was poled and crosslinked, but without the molecular dipole present, a second harmonic was in evidence on laser examination, but the sample containing the molecular dipole exhibited a second harmonic that was about an order of magnitude larger.

EXAMPLE 34

Formation of a Poled Transmission Medium Using a Lower Poling Field Gradient

Example 33 was repeated, except that the field gradient across the electrodes was decreased to $0.8 \times 10^5$ V/cm. Second harmonic generation was again observed.

EXAMPLE 35

Formation of a Poled Transmission Medium Using Side-by-Side Electrodes

Two electrodes were formed on a single optical flat quartz substrate by evaporating chromium to a thickness of about 400 Å in two adjacent areas separated by a gap of 250 μm. One percent by weight of the molecular dipole 4-dimethylamino-4'-methylsulfonylstilbene was dissolved in the monomeric binder precursor tris(2-acryloylethyl)-1,3,5-benzene tricarboxylate along with a small amount of the coinitiator pair of activator ethyl 4-diethylamino-benzoate (B1) and the photosensitizer 3-benzoyl-5,7-di-n-propoxycoumarin (B2) and dichloromethane, similarly as in Example 33. The electrode and intervening gap surface of the quartz substrate was first thoroughly wetted with the solution. The substrate bearing the electrodes was then spun for 2 minutes to produce a smooth uniform coating. A field gradient of $10^5$ V/cm was placed across the gap by connection to the electrodes. Exposure to near UV radiation as in Example 33 for 15 minutes produced crosslinking. Second harmonic generation was observed similarly as in Example 33.

EXAMPLES 36–39

Langmuir-Blodgett Film Formation

Four molecular dipoles were chosen for LB film construction. The molecular dipoles were stilbenes of the general structure 4-R$^1$R$^2$-amino-4'-R-sulfonylstilbene, where Ex. 36 R$^1$, R=—CH$_3$; R$^2$=—C$_{22}$H$_{25}$;
Ex. 37 R$^1$, R$^2$=—C$_{18}$H$_{37}$; R=—CH$_3$;
Ex. 38 R$^1$=—CH$_3$; R$^2$=—(CH$_2$)$_5$C(O)OH; R=—C$_{18}$H$_{37}$;
Ex. 39 R$^1$=—CH$_3$; R$^2$=—(C$_2$H$_4$O)$_2$C$_2$H$_4$OH; —C$_{18}$H$_{37}$.

In each instance the molecular dipole was dissolved in chloroform at a concentration of 1 mM. The chloroform solution was then spread at an air-water interface so that the areal density of molecules at the interface was 0.8 nm$^2$ per molecule. The water contained 0.3 mM CdCl$_2$ and 0.055 mM NaHCO$_3$ in the case of Example 38. For the other examples pure water was used. After waiting 5 minutes for the chloroform to evaporate the films were compressed at a rate of 20 mm/min to a surface pressure of 20 dyne/cm in the case of Example 36, 30 dyne/cm in the case of Examples 37 and 39, and 35 dyne/cm in the case of Example 38. The surface pressure was held constant for 20 minutes and then a fused-silica slide was raised through the interface at a speef of 2 mm/min. As the monolayer at the air-water interface was deposited on the slide, the area of the interface was automatically decreased so as to keep the surface pressure constant during the deposition process.

Second-harmonic generation was measured from the film of each example. The incident beam had a wavelength of 1064 nm and a pulse energy of 1 mJ. The transmitted second-harmonic signal at 532 nm was detected. A value of x$^{(2)}$ was determined for each film (see Table II) by comparing the second-harmonic signal with that of a quartz reference.

TABLE II

| Example | $\chi^{(2)}$ (esu) |
|---|---|
| 36 | $5.0 \times 10^{-8}$ |
| 37 | $7.0 \times 10^{-8}$ |
| 38 | $6.0 \times 10^{-8}$ |
| 39 | $6.5 \times 10^{-8}$ |

The invention has been described in detail with particular reference to preferred embodiments thereof, but it will be understood that variations and modifications can be effected within the spirit and scope of the invention.

What is claimed is:

1. An optical article containing, for the transmission of electromagnetic radiation, a medium exhibiting a second order polarization susceptibility greater than $10^{-9}$ electrostatic units comprised of polar aligned noncentrosymmetric molecular dipoles having an electron donor moiety linked through a conjugated π bonding system to an electron acceptor moiety to permit oscillation of the molecular dipole between a lower polarity ground state and a higher polarity excited state,
   characterized in that the electron acceptor moiety is a sulfonyl moiety.

2. An optical article according to claim 1 further characterized in that means are provided for directing electromagnetic radiation to said transmission medium.

3. An optical article according to claim 1 further characterized in that biasing means are provided for placing an electric field across said transmission medium.

4. An optical article according to claim 3 further characterized in that said biasing means includes at least one transparent electrode in contact with said transmission medium.

5. An optical article according to claim 1 further characterized in that said transmission medium lies in contact with a linear waveguide for electromagnetic radiation.

6. An optical article according to claim 1 further characterized in that said transmission medium is comprised of a Langmuir-Blodgett film.

7. An optical article according to claim 1 further characterized in that said transmission medium is comprised of a Z-type Langmuir-Blodgett film assembly.

8. An optical article according to claim 1 further characterized in that said sulfonyl moiety includes a hydrophilic substituent.

9. An optical article according to claim 1 further characterized in that said sulfonyl moiety includes a hydrophobic substituent.

10. An optical article according to claim 1 further characterized in that said transmission medium is comprised of a Y-type Langmuir-Blodgett film assembly.

11. An optical article according to claim 1 further characterized in that said molecular dipole exhibits the structure $$Y-E-A$$

where

A is a hydrophilic sulfonyl moiety;
E is a conjugated $\pi$ bonding system; and
Y is a hydrophobic electron donor moiety.

12. An optical article according to claim 1 further characterized in that said molecular dipole exhibits the structure $$K-E-M$$

where

K is a hydrophobic sulfonyl moiety;
E is a conjugated $\pi$ bonding system; and
M is a hydrophilic electron donor moiety.

13. An optical article according to claim 1 further characterized in that said transmission medium is comprised of a substrate and a self-assembled film containing said molecular dipole.

14. An optical article according to claim 1 further characterized in that said molecular dipole is held in polar alignment in a surrounding polymeric medium.

15. An optical article according to claim 14 further characterized in that said molecular dipole is covalently bonded to said polymeric medium.

16. An optical article according to claim 15 further characterized in that molecular dipole is covalently bonded to said polymeric medium through the sulfur atom of the sulfonyl moiety.

17. An optical article according to claim 1 further characterized in that said molecular dipole is comprised of the following moieties:

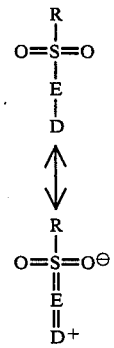

where

D is an electron donor moiety,
E is a conjugated $\pi$ bonding system, which provides a pathway for charge transfer resonance, and
R is an optionally substituted hydrocarbon moiety.

18. An optical article according to claim 1 further characterized in that the molecular dipole is comprised of the following moieties:

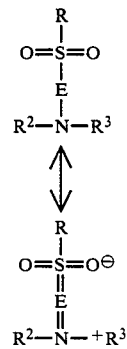

where

E is a conjugated $\pi$ bonding system;

R is an optionally substituted hydrocarbon moiety; and $R^2$ and $R^3$ are hydrogen or optionally substituted hydrocarbon moieties.

19. An optical article according to claim 1 further characterized in that the molecular dipole is comprised of the following moieties:

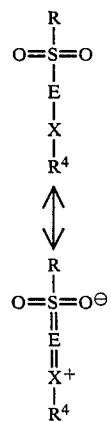

where

E is a conjugated $\pi$ bonding system;

R and $R^4$ are optionally substituted hydrocarbon moieties; and

X is oxygen or sulfur.

20. An optical article according to claim 1 further characterized in that molecular dipoles are comprised of the following moieties:

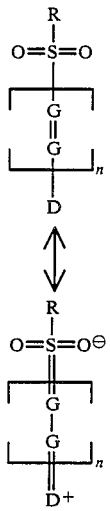

where

D is an electron donor moiety;

G is independently in each occurrence methine or aza, with the proviso that no more than two aza groups can be next adjacent;

n is 4 to 20; and

R is an optionally substituted hydrocarbon.

21. An optical article according to claim 20 further characterized in that n is 8 to 14.

22. An optical article according to claim 20 further characterized in that the linking moiety formed by G includes at least two planar aromatic rings.

23. An optical article according to claim 22 further characterized in that the sulfonyl electron acceptor moiety of the molecular dipole is linked to the electron donor moiety through at least two coplanar carbocyclic aromatic rings.

24. An optical article according to claim 23 further characterized in that the linking moiety is a 4,4'-stilbenoid moiety.

25. An optical article according to claim 24 further characterized in that the linking moiety is a 4,4'-stilbene moiety.

26. An optical article according to claim 1 further characterized in that the sulfonyl moiety is a sulfonimino moiety.

27. An optical article according to claim 1 further characterized in that the electron donor moiety forms a heterocyclic ring with a portion of the conjugated $\pi$ bonding system.

28. An optical article according to claim 1 further characterized in that the electron donor moiety is a secondary amino moiety.

29. An optical article according to claim 1 further characterized in that the electron donor moiety is a tertiary amino moiety.

30. An optical article according to claim 1 further characterized in that the molecular dipole is present in a crystalline form.

31. An optical article according to claim 1 further characterized in that the transmission medium exhibits a second order polarization susceptibility greater than $10^{-8}$ electrostatic units.

* * * * *